(12) United States Patent
Kostoff et al.

(10) Patent No.: US 9,576,499 B2
(45) Date of Patent: Feb. 21, 2017

(54) AUTOMATED SYSTEM FOR DELIVERY OF TARGETED CONTENT BASED ON BEHAVIOR CHANGE MODELS

(71) Applicant: MediResource Inc., Toronto (CA)

(72) Inventors: Paul S. Kostoff, Toronto (CA); Stephen Newport, Toronto (CA)

(73) Assignee: MediResource Inc., Toronto (CA)

( * ) Notice: Subject to any disclaimer, the term of this patent is extended or adjusted under 35 U.S.C. 154(b) by 0 days.

(21) Appl. No.: 14/665,071

(22) Filed: Mar. 23, 2015

(65) Prior Publication Data

US 2015/0194069 A1    Jul. 9, 2015

Related U.S. Application Data

(63) Continuation of application No. 13/526,736, filed on Jun. 19, 2012, now Pat. No. 8,992,228.

(51) Int. Cl.
| | |
|---|---|
| *G09B 19/00* | (2006.01) |
| *G06Q 30/02* | (2012.01) |
| *G06F 17/22* | (2006.01) |
| *G06F 17/24* | (2006.01) |

(52) U.S. Cl.
CPC .......... *G09B 19/00* (2013.01); *G06F 17/2235* (2013.01); *G06F 17/24* (2013.01); *G06F 17/248* (2013.01); *G06Q 30/0269* (2013.01)

(58) Field of Classification Search
USPC .................................................. 434/236, 238
See application file for complete search history.

(56) References Cited

U.S. PATENT DOCUMENTS

| | | | | |
|---|---|---|---|---|
| 7,257,522 B2* | 8/2007 | Hagiwara | ............. | G01M 13/02 477/110 |
| 2007/0288266 A1* | 12/2007 | Sysko | ................... | G06Q 10/00 705/2 |
| 2010/0088344 A1* | 4/2010 | Treat | ...................... | G06Q 30/02 707/794 |
| 2010/0138271 A1* | 6/2010 | Henkin | ............. | G06Q 30/0256 705/14.54 |
| 2011/0178819 A1* | 7/2011 | Mchorney | ............. | G06Q 10/00 705/2 |
| 2011/0196212 A1* | 8/2011 | Peters | ................. | G06F 19/3475 600/300 |
| 2011/0289443 A1* | 11/2011 | Heaven | ............ | G06Q 10/06398 715/772 |

(Continued)

OTHER PUBLICATIONS

Marshall, S. et al. "The Transtheoretical Model of Behavior Change: A Meta-Anaylsis of Applications to Physical Activity and Exercise." The Society of Behavioral Medicine. vol. 23, No. 4, pp. 229-246 (2001).

(Continued)

*Primary Examiner* — Kesha Frisby
(74) *Attorney, Agent, or Firm* — Nixon Peabody LLP

(57) ABSTRACT

A system for delivering targeted content based on user behavior stores multiple behavior change models, generates a user record containing information regarding a user, selects a behavior change model from the multiple stored models based on the information in the user record, and delivers to the user targeted content based on the selected behavior change model, the targeted content being adapted to influence the user to change behavior according to the selected behavior change model.

20 Claims, 23 Drawing Sheets

(56) References Cited

U.S. PATENT DOCUMENTS

| | | | | |
|---|---|---|---|---|
| 2012/0004924 A1* | 1/2012 | Kachnowski | ......... | G06F 19/345 |
| | | | | 705/2 |
| 2012/0042253 A1* | 2/2012 | Priyadarshan | ......... | G06Q 30/02 |
| | | | | 715/733 |
| 2012/0178064 A1* | 7/2012 | Katz | ........................ | G09B 5/00 |
| | | | | 434/236 |
| 2012/0178070 A1* | 7/2012 | Wiegand | ............... | G06F 19/324 |
| | | | | 434/262 |
| 2012/0244504 A1* | 9/2012 | Wasserman | ............ | G09B 19/00 |
| | | | | 434/238 |
| 2012/0278331 A1* | 11/2012 | Campbell | ........ | H04N 21/44204 |
| | | | | 707/740 |
| 2012/0323558 A1 | 12/2012 | Nolan | | |
| 2013/0041683 A1* | 2/2013 | Boissel | .................. | G06F 19/12 |
| | | | | 705/2 |
| 2013/0130213 A1* | 5/2013 | Burbank | ............... | A61B 5/1118 |
| | | | | 434/236 |
| 2013/0262216 A1* | 10/2013 | Zhang | ................ | G06Q 30/0631 |
| | | | | 705/14.36 |

OTHER PUBLICATIONS

International Search Report, mailed Oct. 21, 2013 which issued in corresponding International Patent Application No. PCT/IB2013/001268 (3 pages).

Written Opinion, mailed Oct. 21, 2013 which issued in corresponding International Patent Application No. PCT/IB2013/001268 (6 pages).

* cited by examiner

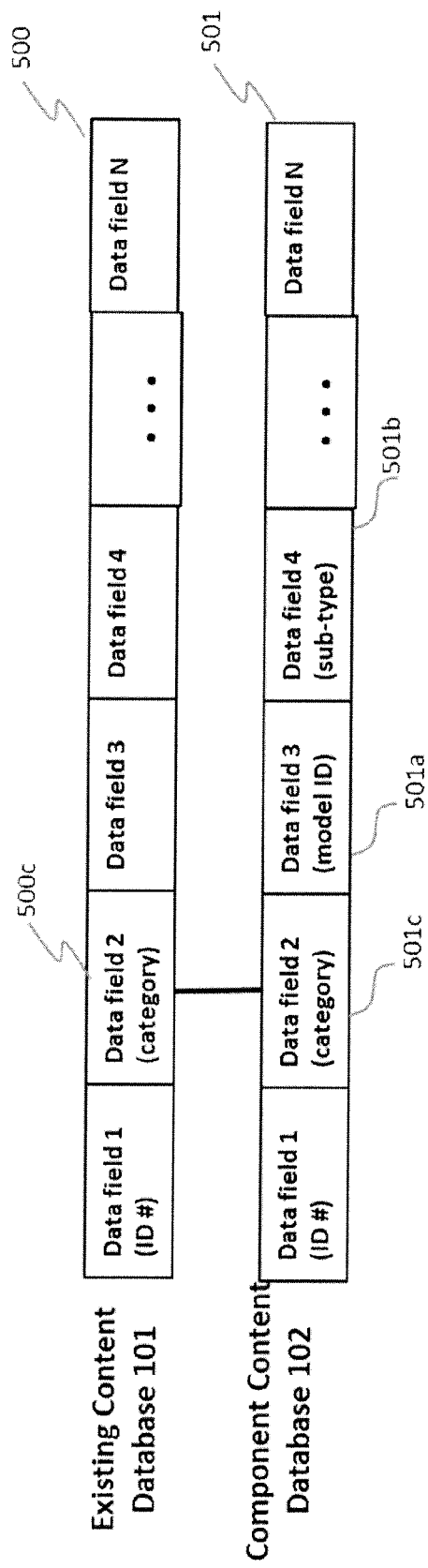

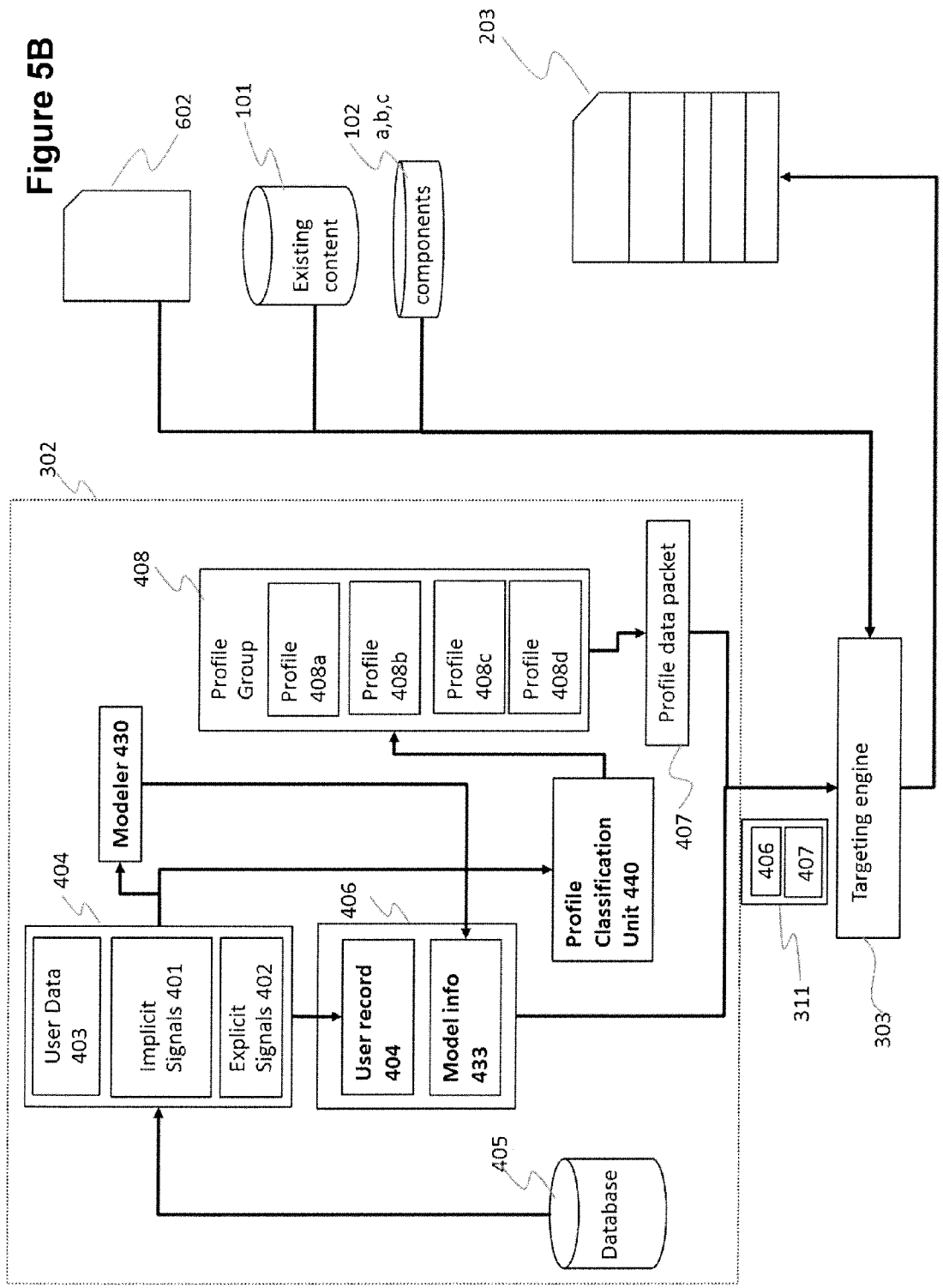

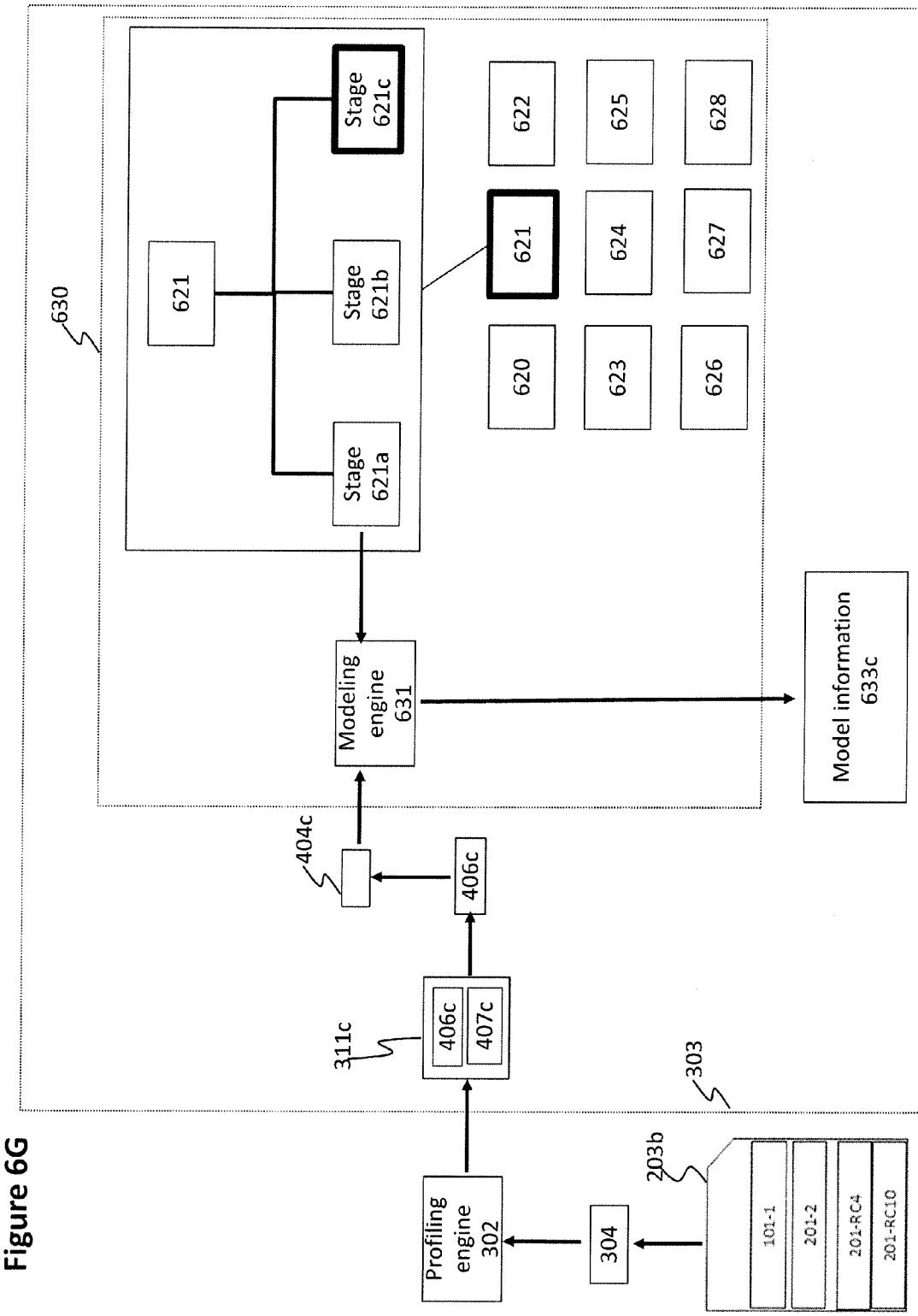

AUTOMATED SYSTEM FOR DELIVERY OF TARGETED CONTENT BASED ON BEHAVIOR CHANGE MODELS

This application is a continuation of and claims priority to U.S. patent application Ser. No. 13/526,736, filed Jun. 19, 2012, now allowed, which is incorporated herein in its entirety.

FIELD OF THE INVENTION

The present invention relates to the delivery of targeted content based on existing content databases and user behavior.

BACKGROUND OF THE INVENTION

Publishers face several key challenges in order to compete in today's digital environment. Users, advertisers, sponsors and content licensors require publishers to be able to deliver targeted information across multiple digital channels. In order to effectively serve users of its content, a publisher must be able to deliver the right content to the right audience at the right time. Content targeting is of value because it improves relevancy, saves time and reduces the effort required to deliver content to users. There is significant business value to publishers who develop the capability of delivering highly targeted content to a targeted audience and influence behavior.

Existing content databases from publishers have a legacy established over many years. Articles can be lengthy, consisting of 1000 or more words. Often the content has become outdated. It is a significant and expensive undertaking for a publisher to update large legacy content databases or change its data structure. Cost and effort considerations create significant barriers for publishers to adapt their legacy content to a rapidly changing and evolving digital world. To remain competitive publishers need to update and adapt content, as well as create new content types for multiple media channels such as web, mobile or social media. They must also be able to apply content targeting and behavior change models to enhance the user experience and create new business models.

To deliver a more robust digital experience that maximizes content value, publishers need to create more comprehensive and flexible content structures. Futhermore, publishers must deliver targeted content based on user behaviors, predictive behavior modeling, readiness to change mind-set and user profiles to maximize the value of content and the impact it can have.

To use a health example, a page of general health information is of low value since it is not targeted to any particular disease state. A page of content related to a specific disease (e.g. diabetes) is of medium value since it now targets a patient with diabetes. Going much further in the targeting and profiling chain, a page of content specific to a patient with diabetes, who is female, is taking medication and is ready to make a lifestyle change is of extremely high value. Moreover, the version of diabetes content delivered to a person who is ready to make a lifestyle change should be different than the diabetes content delivered to a diabetes patient who is not ready to make a lifestyle change. Publishers face many challenges to efficiently provide this level of content targeting and customization beyond the subject matter. They simply deliver diabetes content and do not consider more detailed targeting and behavior parameters. It is this additional detailed targeting around behavior models and more defined user profiles that will create a more valuable user experience and increase the value of a publisher's content.

In order to manage the complex task of organizing content databases, publishers will often use a content management system (CMS) or similar publishing system. CMS's can be effective in organizing content articles as documents. Each document, or content article, is generally stored as single block of text. Any attempt to insert targeted messages or advertisements into the editorial flow in the body of an article is done in a very clumsy manner. This creates a disconnect between the original article flow and the inserted element (these "insertions" are often done in the margins outside the boundaries of the text article or as advertisement boxes that break up an article flow). Within traditional publishing systems content articles, or documents, are tagged according to a subject matter or contextually organized based on key words within the document. In some cases publishers may employ semantic targeting of content, which is looking closer at the meaning and sense of the words in an article rather than just using key-words alone. Whether using subject, contextual or semantic methods, publishers can still only deliver associated content (or advertisements) based on a particular subject matter, key word or combination of key words. They do not provide content based on a detailed user behavior modeling or profiles. Since publishers using traditional content management systems store articles as single blocks of text they do not segment an article into components, or insert component content into the body of a text article. This approach diminishes the potential value of content, reduces readability qualities and limits the flexibility to distribute content across multiple media channels.

SUMMARY OF THE INVENTION

In accordance with one embodiment, a system for delivering targeted content based on user behavior stores multiple behavior change models, generates a user record containing information regarding a user, selects a behavior change model from the multiple stored models based on the information in the user record, and delivers to the user targeted content based on the selected behavior change model, the targeted content being adapted to influence the user to change behavior according to the selected behavior change model.

In one implementation, the selected behavior change model includes a plurality of stages corresponding to different states of behavior change, and the targeted content is adapted to influence the user to make behavior changes as the user progresses through the different states. The system can determine the current state of the user's behavior change, and change the targeted content based on the current state. The behavior change models may include trans-theoretical stages of change models, and the targeted content may include component content cached according to the behavior change models. The targeted content also may include targeting content from a content database and targeted component content from at least one component content database. The content may be customized for delivery over a selected of the media or distribution channels.

BRIEF DESCRIPTION OF THE DRAWINGS

The invention will be better understood from the following description of preferred embodiments together with reference to the accompanying drawings, in which:

FIG. 5A shows data structures for the existing content database and the component content databases.

FIG. 5B shows another embodiment of the profiling engine 302.

FIG. 6G demonstrates the model grouping operation for the third iteration of a sequential behavior change process within the targeting engine 303.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

This invention describes a system that allows publishers to integrate component content into existing content databases and editorial processes. The system also provides publishers with the ability to integrate behavior change models into their content databases; improve content targeting and create a higher degree of personalized user experience.

In particular, the system provides a method to deliver targeted content in order to influence users into changing their behaviors, or adopting new behaviors using these behavior change models as a guide.

The following description uses health care as an example, but it should be understood that the system is not limited to health care databases. This invention could be used in many different fields, for example, news media, social media, education/training and marketing.

The system overcomes common barriers publishers face in updating and maintaining large content databases, publishing content across multiple digital channels and providing an efficient method for targeting content. This invention can be implemented as a discrete publishing tool as part of another computer system or software product.

The system utilizes component content, user profiling and behavior modeling methods that can be integrated into existing content databases and legacy articles to improve targeting of content.

Figure 1:
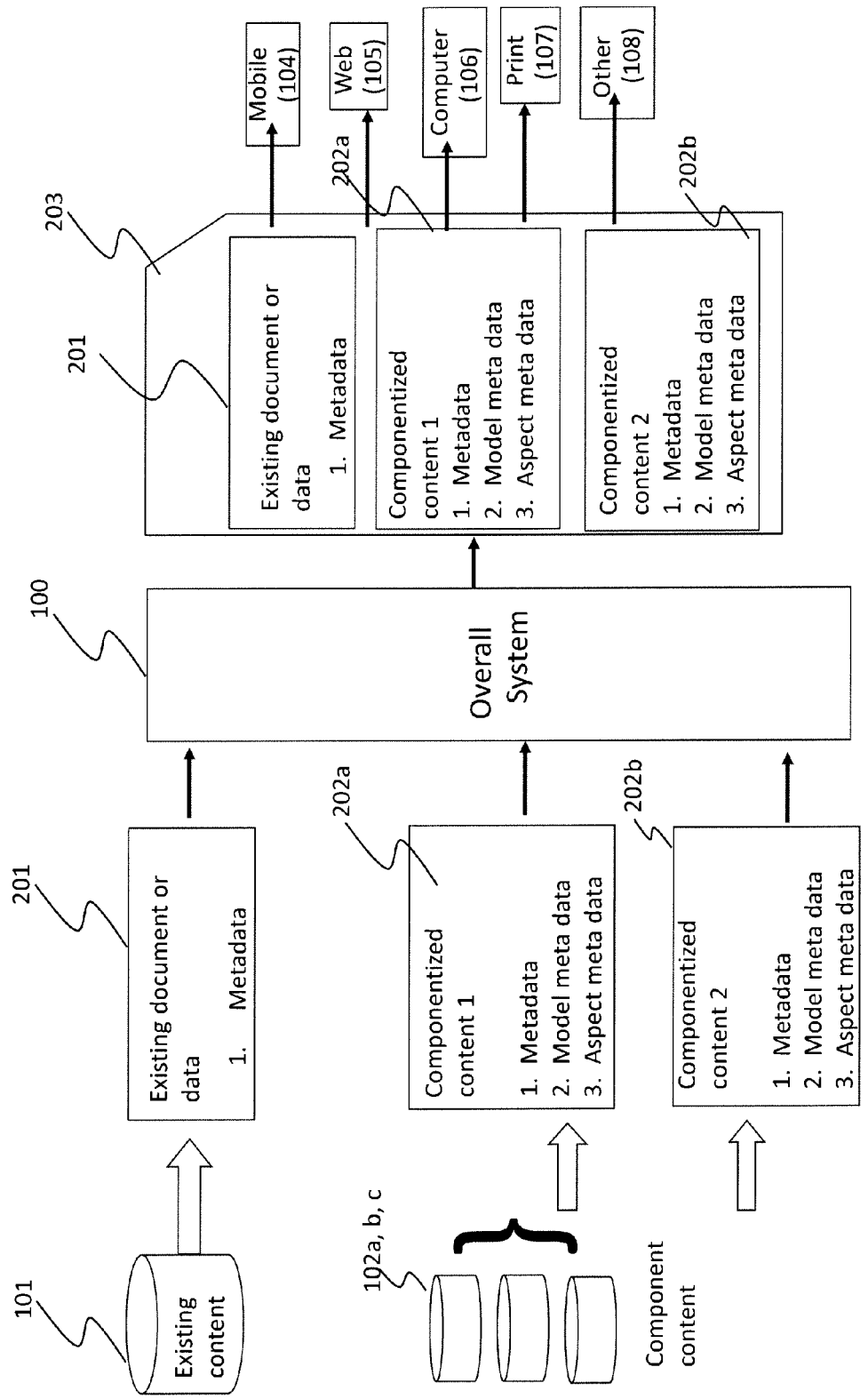
FIG. 1 shows an embodiment of the creation of componentized content.

Component content can be any element or object such as text, images, decision support tools, interactive components, geography-specific content, content specifically designed for a distribution channel such as mobile or any object or content. Because component content is smaller and more agile, it is more cost-effective to create and maintain. It also allows publishers to create highly targeted content in an efficient and cost effective manner. Because it is a fraction of the size of the existing legacy article, it is much easier to update and adapt to the rapidly changing needs and targeting requirements for digital content. Component content also allows publishers to use common components across multiple articles. Component content can have its own data structures and taxonomies that are independent of existing legacy content data structures and taxonomies. Component content can be efficiently customized to deliver highly targeted messages to users. Component content integrates seamlessly into existing content flow to create the perception of an original article that is greater in length and more relevant to the user, so that when a user views a page it has a high degree of editorial continuity and meaning Component content differs significantly from contextual or semantic advertisements since contextual and semantic ads do not achieve the same level of continuity and targeting, do not integrate into the publishers' editorial processes, do not integrate within text articles at the database level with high degrees of continuity or readability, and do not integrate complex behavior change models as part of the publishers content editorial processes. Since component content and existing content can be physically connected within the same database as part of a publishers editorial process, this system overcomes other barriers such as creating unique database renditions to improve internet search engine rankings FIG. 1 exemplifies an embodiment of a process for the creation of unique documents with componentized content or data. In FIG. 1, the overall system 100 defines which content is going to be extracted from existing content database 101, one or more content component database(s) 102a, 102b, 102c.

Content 201 is extracted from one or more existing content database(s) 101 (the existing content database may also contain componentized content). One or more component content elements 202a, 202b are extracted from the content component database(s) 102a, 102b, 102c. One or more component content tags align with tags of existing content 201.

In one embodiment the existing and/or component content is associated with a content or behavior change model.

A new and unique document rendition 203 is created based on the merging of the existing content 201 and the one or more elements of componentized content 202a, 202b. The newly created component content 203 contains enhanced tags, attribute data or metadata. In one embodiment the new document can be contained within one or more defined template formats, each template format being associated with one or more content types and/or content models.

Document rendition 203 is then delivered to the end user over various channels, such as mobile 104, web 105, computer 106, print 107 and other 108.

These operations are performed based on operator-defined targeting criteria, which are themselves set by considering information such as signals sent by the user, user profiles and behavior change models. In one possible embodiment targeting rules are manually set by an operator. In another possible embodiment they are set using automated methods. In yet another embodiment, it is possible to have targeting rules set using a combination of manual and automated methods.

Component content can be stored as a separate database or within the existing content database or table structure. Component content data structure uses part or all of the existing content database 101 data structure or taxonomy in order to connect component content to the existing content database.

In addition, overall system 100 can be configured to extract existing content as well as one or more components for each distribution channel. In this manner content targeting can be customized and targeted to individual users, according to each distribution channel and for individual users within a specific distribution channel. Component content can be created manually or imported from external sources.

Enhanced tagging and labeling of component content improves targeting based on a specific behavior model, user profile, user profile group or other targeting model. Enhanced tagging and labeling of component content can be done without affecting the tagging and labeling of the original content database. In another embodiment the existing content database tagging and labeling can be modified to align with component content tagging and labeling.

Component content tagging can be done manually, automatically and using various data formats such as extensible markup language (XML), HL-7 or any known data model.

In order to fully realize the potential of content to be used as a behavior change enabler, to create more robust user profiles, or improve the efficiency of content management, publishers can also attach aspect related data (or attributes) as well as meta-data to content. An "aspect" attached to a content element attaches deeper functionality to the element.

For example, an element that is given a certain aspect assignment can be handled differently in a workflow. Another example would be where an aspect assignment onto a certain content type automatically adds one or two components to the asset. An element can be a component, an asset, a topic or any other content entity on the system Inherited properties can also be used to carry content labels and code down through the content model. Content aspects and inherited properties go beyond meta-data, since meta-data only allows the association of meta-tags to a content element. Aspects have advantages over using meta data alone, since it allows the ability to attach "intelligence" to content using executable code within a piece of content. The content plays a more functional role in creating user profiles, adhering to behavior models and delivering a more personalized user experience.

Overall system 100 can be implemented as a subsystem which is part of another system. Overall system 100 can be implemented in software, hardware, or a combination of hardware and software. It can be implemented in a networked fashion, or in a distributed fashion.

Figure 2:
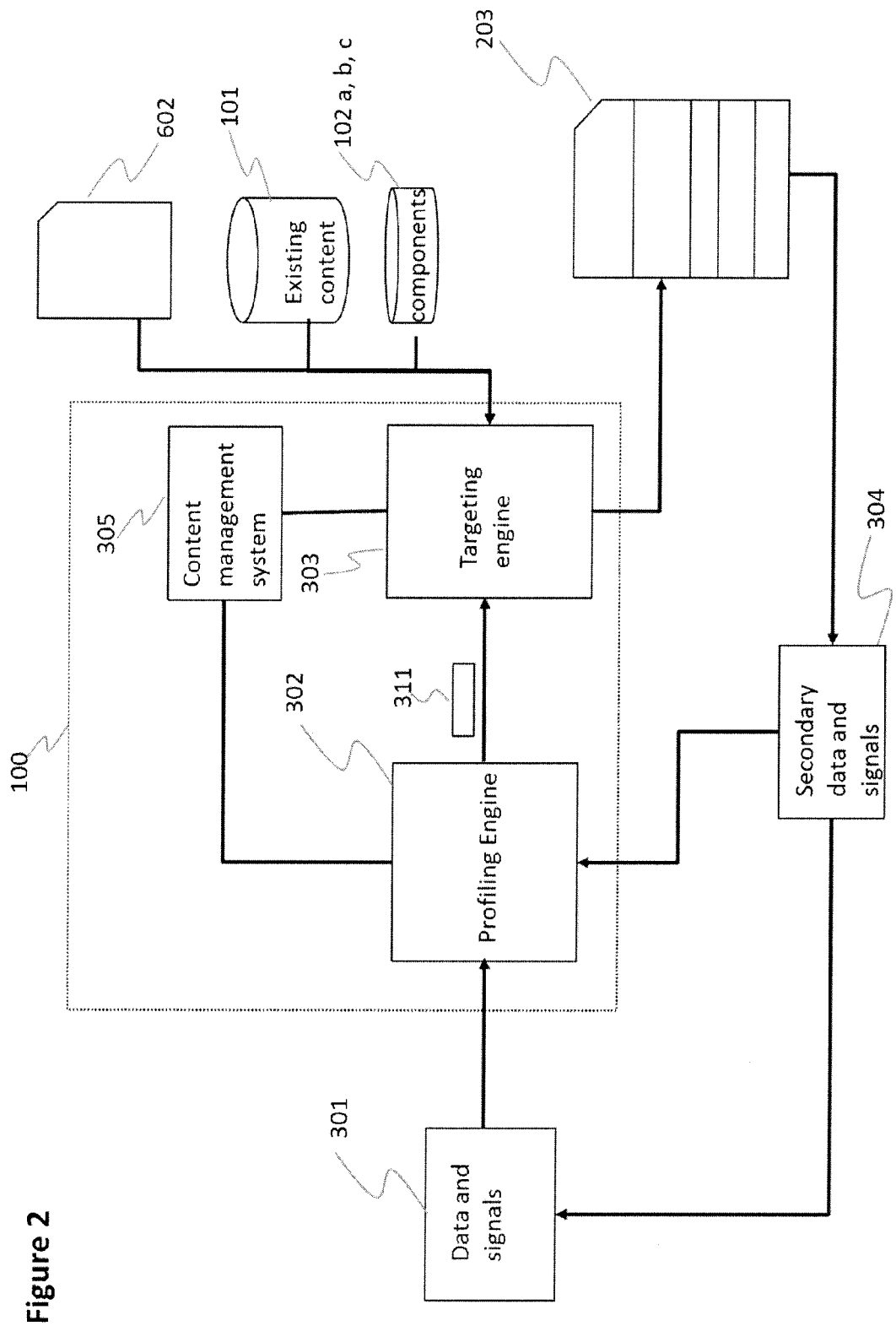
FIG. 2 shows a detailed description of an embodiment of overall system 100.

FIG. 2 provides a detailed description of a possible embodiment of overall system 100. In this embodiment, the overall system 100 comprises a profiling engine 302, a targeting engine 303 and a content management system 305. Data and signals 301 (such as personal or medical data, user identifiers, demographics, survey results, website click trails, mobile data, geographic or hyper-local information, aspect data or any other data that can be used to develop a user profile) are acquired or input and sent to the profiling engine 302.

The profiling engine 302 compiles and prioritizes signals, and may optionally align signals with one or more behavior models based on an operator defined scoring system of the signals. In one embodiment, the profiling engine is connected to a content management system 305. Content management system 305 works to improve accuracy of content targeting by aligning content with behavior models and/or user profiles. In another embodiment, the profiling engine 302 is connected via a network with a content management system 305 that defines the data structure for existing content database 101 and one or more component content databases 102a, 102b, and 102c. In another embodiment the profiling engine 302 and content management system 305 can be contained within the same system.

The profiling engine 302 passes data output 311 to the targeting engine 303. The targeting engine 303 may pull content from one or more existing content databases 101; one or more componentized content databases 102a, 102b, 102c; and may even select display template 602 to compile one or more componentized content articles 203. In one embodiment targeting engine 303 is connected via a network with content management system 305. In another embodiment, targeting engine 303 is directly connected to content management system 305. In another embodiment the targeting engine 303 and content management system 305 are contained within the same system.

In yet another embodiment, profile engine 302, content management system 305, targeting engine 303 and content databases 101 and 102a, 102b, 102c can be contained within the same computer or system. In yet another embodiment, profile engine 302, content management system 305, targeting engine 303, content databases 101 and 102a, 102b, 102c are connected together via a network. Additionally, profile engine 302, content management system 305 and targeting engine 303 can be implemented either in software, hardware, or a combination of software and hardware.

User activity and data input on the resulting target content page 203 results in secondary data and signals 304 that are sent to the profiling engine 302 or appended to data and signals 301. Secondary signals and data 304 can also contain information about what content a user has viewed in order to avoid displaying the same content in the future.

In one embodiment the one or more componentized content articles 203 contains additional metadata associated with data obtained from existing content database 101 and component content databases 102a, 102b, 102c. This additional metadata can be used to generate secondary data and signals 304 to the profiling engine 302.

Additionally certain signals can be used to generate secondary data and signals 304. In one embodiment the signal might include the length of time on a page. In another embodiment the signal might contain results of a questionnaire that is associated with a particular behavior model ID. In another embodiment it might contain an action such as a mouse click on a particular content component that would indicate the user is highly interested in a particular aspect of the data from the existing content database 101. The generated secondary data and signals 304 can be sent to the profiling engine 302.

In another embodiment, component content databases 102a, 102b, 102c may contain elements which can be inserted into the one or more componentized content articles 203 and used to provide secondary data and signals 304 to refine the user targeting. In one embodiment, a survey could be inserted into the one or more componentized content articles 203 and used to provide secondary data and signals 304. In another embodiment a hyperlink to a local event could be inserted, that when clicked on creates a secondary signal 304 indicating a user's most probable geographic location. In yet another embodiment a download for a mobile application contained in component content databases 102a, 102b, 102c could be inserted into the one or more componentized content articles 203, which when clicked on sends secondary data and signals 304 that the user prefers to receive information on a mobile device. Each activity or iteration cycle provides additional data to refine user profiling or determine changes in content served.

In another embodiment the profiling engine 302 can be configured to discriminate between data signals 301 and secondary data and signals 304 in order to assess the confidence and accuracy of signal strength and create more accurate content targeting. This feedback loop can continue perpetually to continuously refine user profiles. Feedback and reporting mechanisms provide publisher with insights on modifying profiling and targeting or development of new content components. In this manner content components are not static text but are actively involved with user profiling and content targeting.

Figure 3:
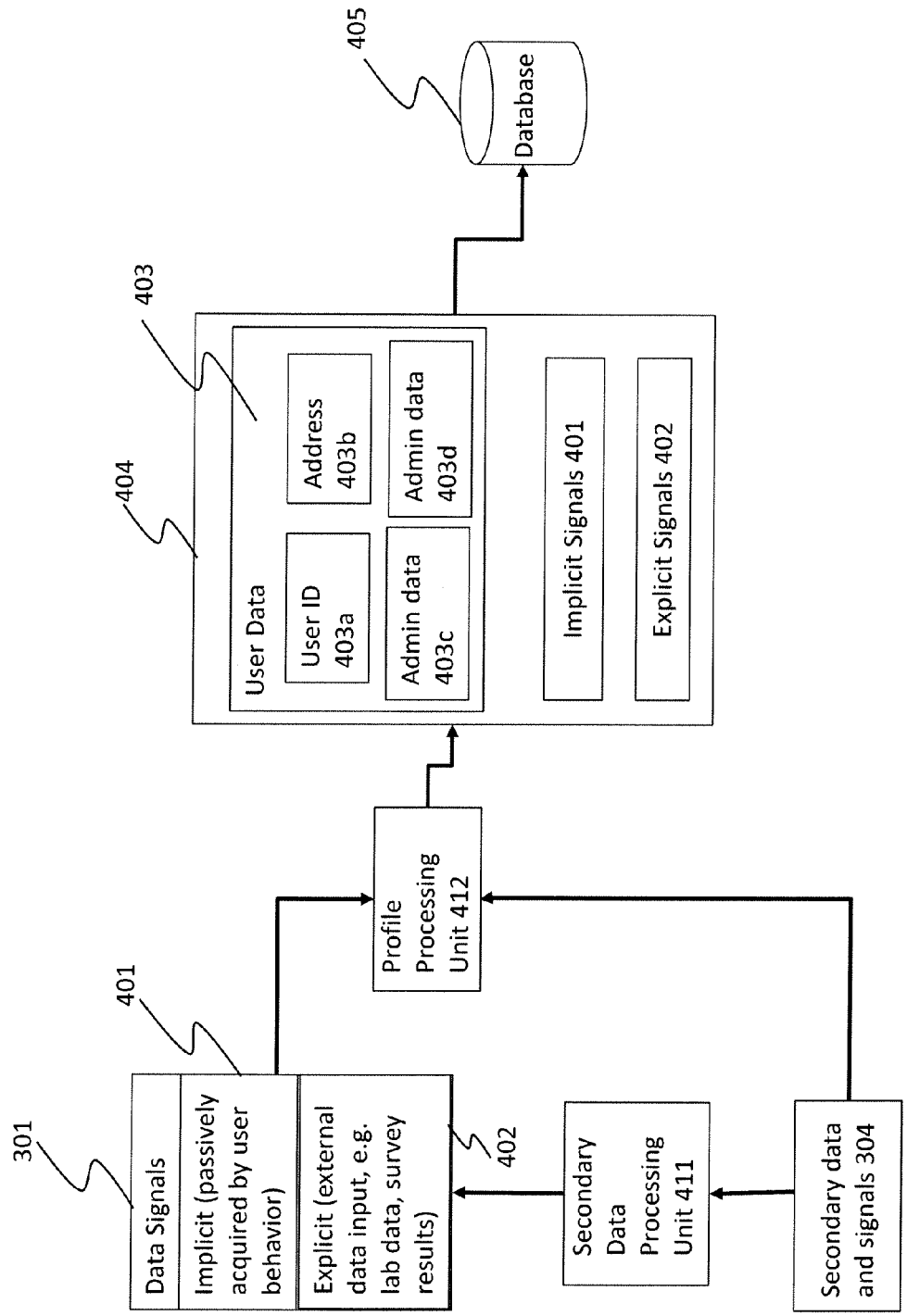
FIG. 3 shows a more detailed example of the operation of the profiling engine 302.

FIG. 3 shows a more detailed example of the operation of the profiling engine 302 to construct and store a user record 404. Data signals 301 could be implicit data signals 401, which are gathered implicitly through user activities such as observed user behaviors, website click trails or other activities, or explicit data signals 402 which are gathered explicitly through external data acquired directly from the user or from third party computers such as user medical data, survey results or other explicit data capture modalities. In another embodiment, secondary data and signals 304 can be processed using, for example, a secondary data processing unit 411, to create data signals 301.

Data signals 301, together with secondary data and signals 304 can be combined to form a user record 404. User data 403 (such as user ID 403a, address 403b or other administrative user data 403c and 403d) can also be added to the user record 404. These operations can be performed using, for example, a profile processing unit 412.

In one embodiment the implicit signals 401 and explicit signals 402 can be assigned a strength coefficient that provides a confidence level to the accuracy of the signal. In a further embodiment, the profile processing unit 412 can, as previously explained, be configured to discriminate between data signals 301 and secondary data and signals 304 in order to assess the confidence and accuracy of signal strength and create more accurate content targeting. A user record 404 is created that includes user data 403, implicit signals 401, explicit signals 402, secondary data signals 304, or any combination thereof.

In a further embodiment, profile processing unit 412 and secondary data processing unit 411 can be part of the same system, or connected together via a network. Profile processing unit 412 and secondary data processing unit 411 can be implemented in software, hardware or a combination of software and hardware.

User record 404 can be stored in one or more user databases 405 and can allow users or third parties to enhance user data and content targeting. In another embodiment the user ID 403a can be used by third parties to send or receive external data or content to a user record across a computer network or the internet. In yet another embodiment the user ID 403a could be used by a hospital, clinic, pharmacy or another third party computer to send or receive medical information to or from a user record 404. In yet another embodiment data in the user record 404 can be used by a mobile device or social media website to target content or messages based on geographic location.

In a further embodiment, user data 403, implicit signals 401 or explicit signals 402 can be grouped into one or more behavior change models within the profiling engine 302. User data 403, implicit signals 401 and explicit signals 402 can belong to the same model or in another embodiment can form independent models. The user record 404 structure allows for highly complex behavior modeling for the purpose of content targeting that goes beyond traditional targeting based on user data alone. Models can include advanced behavior change models such as the trans-theoretical stages of change model, lifestyle risk or other user risk models. In another embodiment one or more models can be combined to refine content targeting. The profiling engine 302 can contain any number of behavior models using any combination of data signals. Models can be selected within the profiling engine.

User data 403, implicit signals 401 and explicit signals 402 can each form independent models or the different signal sources can combine within the same model. For example a user record 404 may contain i) user data 403 indicating they are of a certain age that is associated with higher risk of disease, ii) implicit data 401 that the user viewed diabetes information and iii) completed 2 user surveys that indicated they are a) low in knowledge about diabetes and b) they are receptive to make lifestyle changes. In one embodiment a behavior change model can consider all types of data (401, 402 and 403) to target content, or in another embodiment only use explicit signals 403 to target content. In another embodiment a user may complete a component content survey that sends signal data indicating a user's health risk at a given point in time and can calculate the user's relative position within a health risk behavior change model. Content would then be targeted based on a structured content model that provides the right content to the user at the most appropriate time in order to move them along a behavior change continuum.

Figure 4:
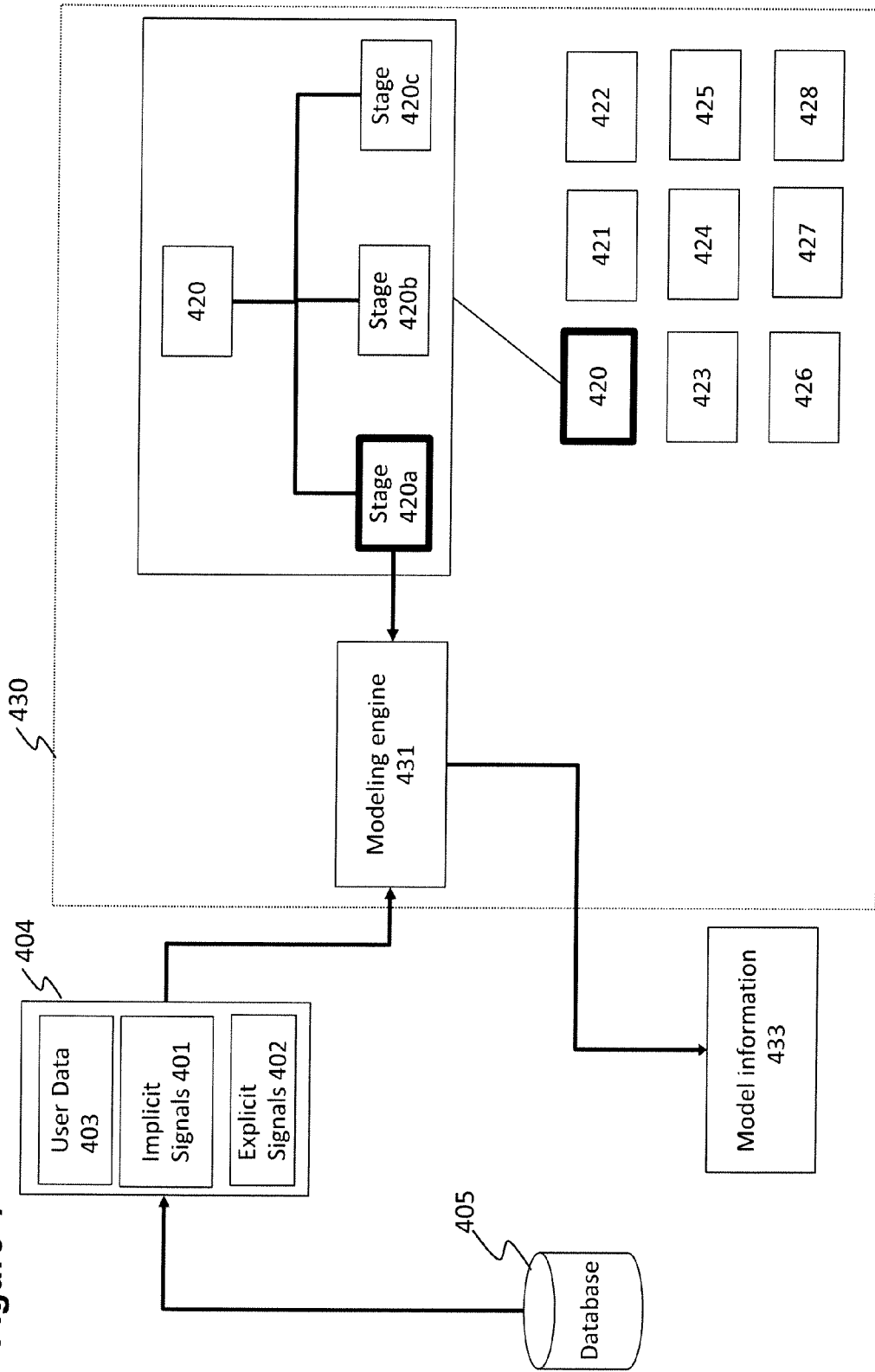
FIG. 4 shows an example of model grouping operation within the profiling engine.

An example of model grouping operation is shown in FIG. 4. Modeler 430 within profiling engine 302 contains modeling engine 431. Modeling engine 431 processes user record 404, and determines that based on the data contained within user record 404; model 420 should be selected from behavior change models 420-428 stored within modeler 430.

Model 420 contains stages 420a, 420b and 420c, each stage corresponding to a different state of behavior change for a given user. Modeling engine 431 further determines that based on the data contained within user record 404, the user is currently at stage 420a. Modeling engine 431 then outputs model information 433 to a data packet 406.

In another embodiment, modeling engine 431 could change user record 404 so that model information 433 is contained within user record 404.

FIG. 4 demonstrates one possible embodiment to perform grouping into behavior change models in profiling engine 302. This operation could also be carried out within the targeting engine 303. An embodiment to enable this will be described below in FIGS. 6A and 6B.

Regardless of the method for processing user data, this form of targeting is a improvement over using user data 403 alone since it aligns behavior models with existing and/or component content that is associated with a specific behavior change model. One potential use of this is to influence behavior using highly refined content models rather than just relying on user data or user demographics alone.

Aligning users with content models improves the efficiency of delivering targeted content since content can be cached according to one or more behavior models.

Figure 5:
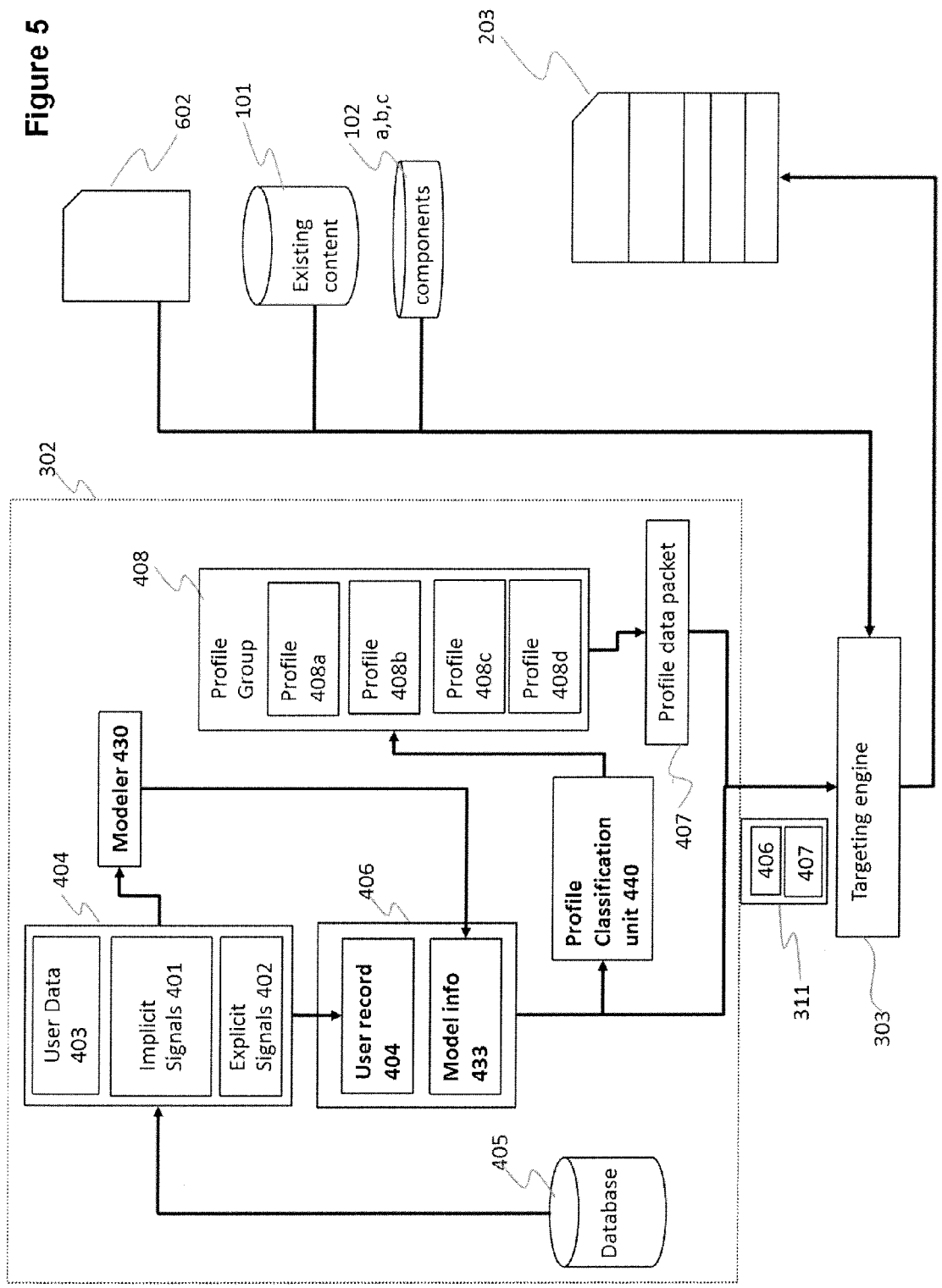
FIG. 5 shows the grouping of user data and models into one or more profiles.

As shown in FIG. 5, in another embodiment user data and models can be grouped into one or more profiles 408. In one embodiment, this operation can be carried out by a profile classification unit 440. If the model grouping operation was carried out within the profiling engine 302, then in one embodiment, the user data 404 and model information 433, is input to profile classification unit 440 via a data packet 406. In another embodiment, modeler 430 and profile processing unit 412 could send model information 433 and user record 404 directly to profile classification unit 440. Profile classification unit 440 can then use this information to determine, for example, that user record 404 and model information 433 should be grouped into profile group 408 containing profiles 408a, 408b, 408c and 408d. This information can then be included in profile data packet 407 as shown in FIG. 5. Profile classification unit 440 can be implemented in software, hardware or a hardware/software combination.

In an alternative embodiment, if the model grouping operation was carried out in the targeting engine, then the user record 404 is input to profile classification unit 440 via data packet 406. Alternatively, the profile processing unit 412 could send user record 404 directly to profile classification unit 440. Profile classification unit 440 can then use this information to determine, for example, that user record 404 should be grouped into profile group 408 containing profiles 408a, 408b, 408c and 408d. This information can be included in profile data packet 407 as shown in FIG. 5.

Profiles allow content to be grouped into larger collections and cached so that targeting of information remains accurate yet considers the need to cache common profiles to ensure efficient database and server performance.

In FIG. 5, the data packets 406 and the profile packets 407 are combined into data output 311, which is then transmitted to the targeting engine 303.

FIG. 5A shows data structure 500 for existing content database 101 and data structure 501 for the component content databases 102a, 102b and 102c. Data fields 500c and 501c allow linking of data in existing content database 101 and one or more component content databases 102a, 102b and 102c. In another embodiment existing content 500c and component content 501c can be linked using standard data taxonomies such as ICD-10, SNOMED (in the case of medical content). In yet another embodiment additional metadata can be applied to existing content 101 to align data fields with those in one or more component content databases 102a, 102b and 102c with a greater degree of accuracy.

FIG. 5B shows another embodiment of the profiling engine. Here, user record 404 is fed to the profile classification unit 440 and the modeler 430. The modeler generates model info 403, which is packaged into data packet 406 along with user record 404. The profile classification unit 440 generates profile group 408, which is packaged into profile data packet 407. Data packet 406 and profile packet 407 are then combined into data output 311 which is then transmitted to the targeting engine 303.

Figure 5C:
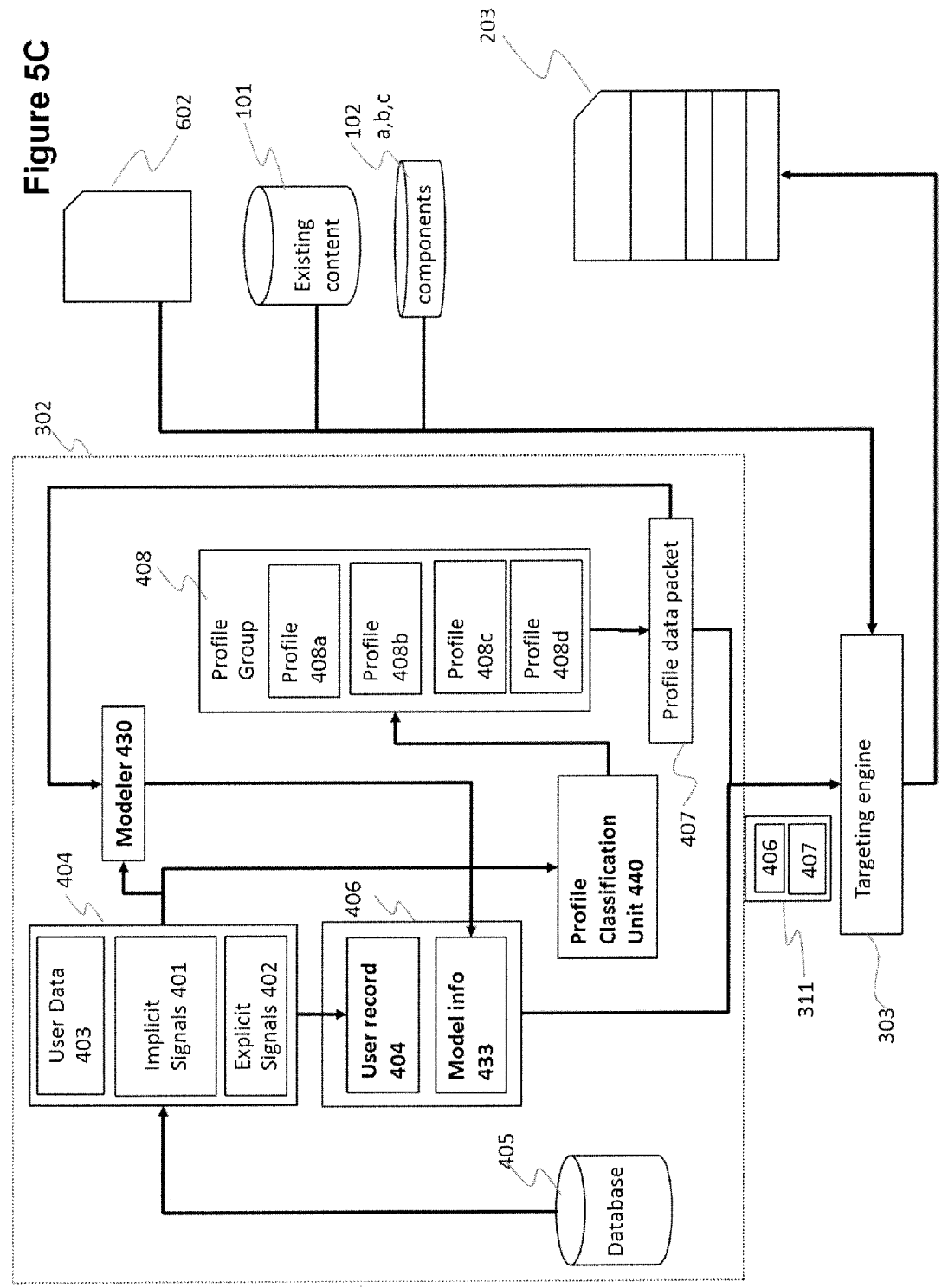
FIG. 5C shows another embodiment of the profiling engine 302

FIG. 5C shows another embodiment of the profiling engine. Here, user record 404 is fed to the profile classification unit 440, and modeler 430. The profile classification unit 440 generates profile group 408. Profile group 408 is packaged into profile data packet 407, and sent to the modeler 430. The modeler takes profile group 408 and user record 404, generates model info 403, which is packaged into data packet 406 along with user record 404. Data packet 406 and profile packet 407 are then combined into data output 311 which is then transmitted to the targeting engine 303.

Figure 6:
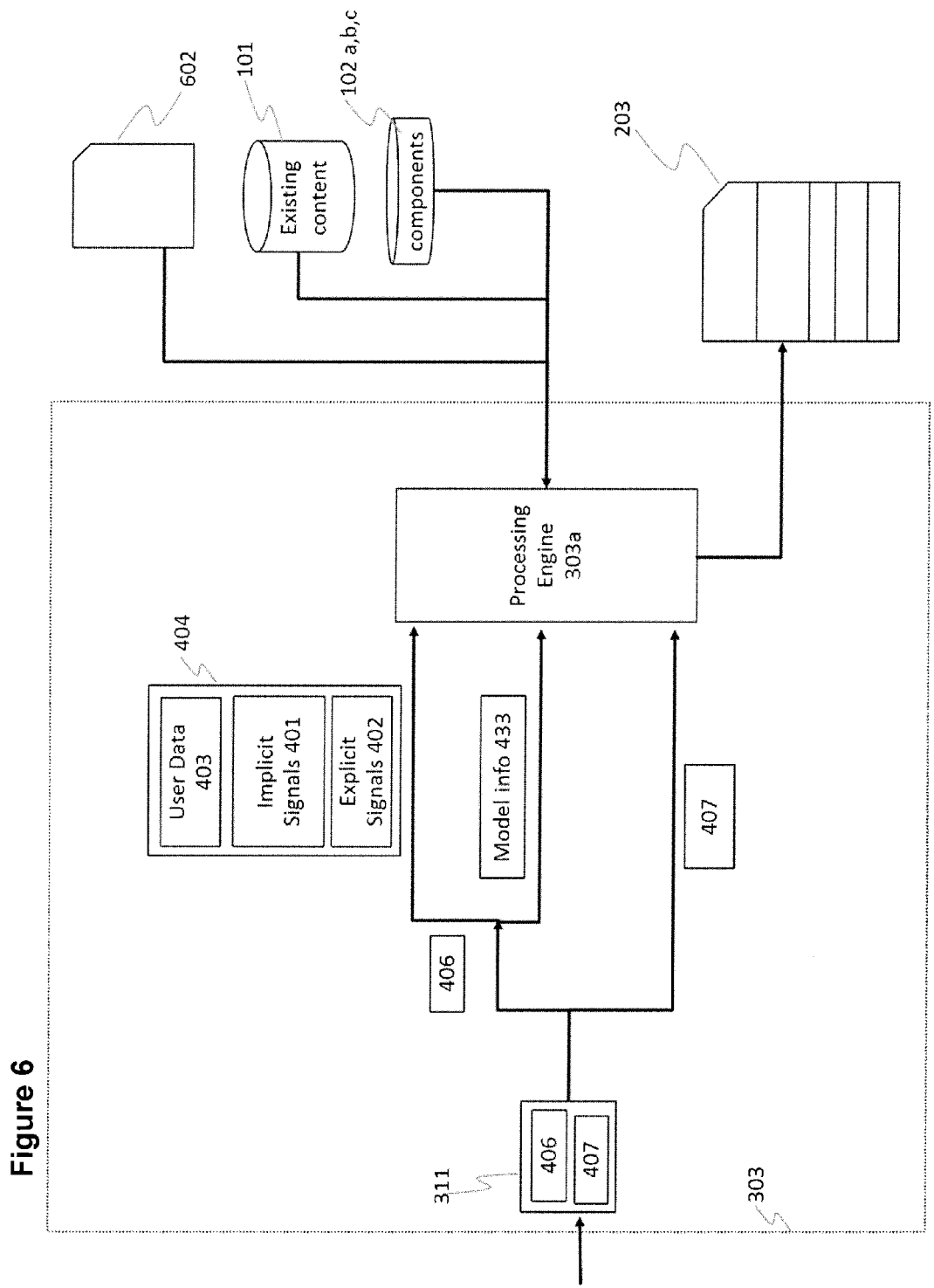
FIG. 6 demonstrates the operation of one possible embodiment of the targeting engine 303.

FIG. 6 demonstrates the operation of one possible embodiment of the targeting engine 303. In targeting engine 303, data output 311 is parsed into data packet 406 and profile data packet 407. Data packet 406 is then further parsed into user record 404 and model information 433. In one embodiment, processing engine 303a in targeting engine 303 processes all this information and then selects appropriate content from existing content database 101, and one or more component content databases 102a, 102b, and 102c. Targeting engine 303 then selects display template 602 and inserts information from existing content database 101 and one or more component content databases 102a, 102b and 102c to create one or more componentized content articles 203.

Figure 6A:
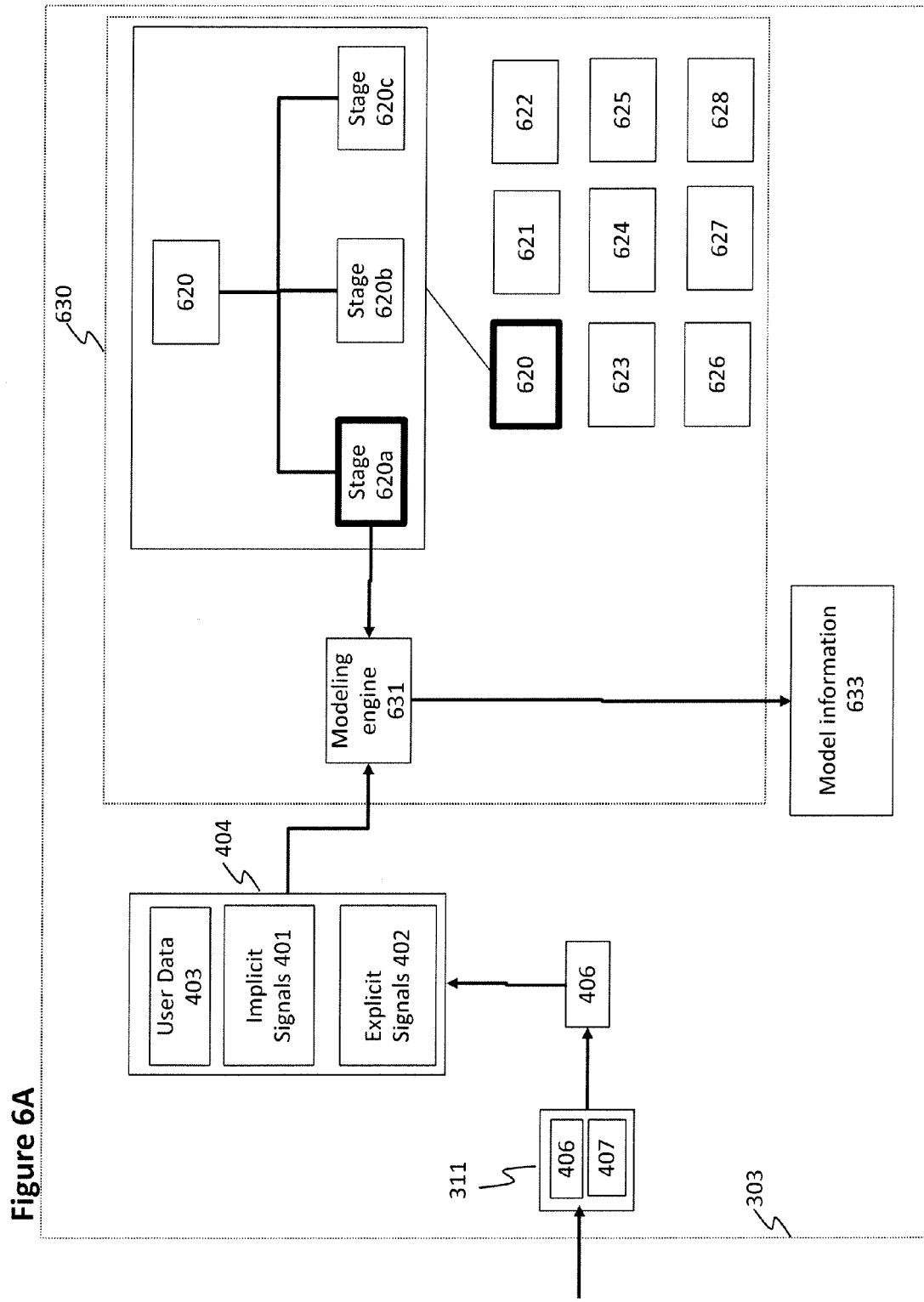
FIG. 6A demonstrates the model grouping operation within the targeting engine 303.

As explained previously, the model grouping operation could be performed within the targeting engine 303. An example is shown in FIG. 6A. Targeting engine 303 parses data output 311 to obtain data packet 406 and profile data packet 407. Targeting engine 303 processes data packet 406 to obtain user record 404. User record 404 is then sent to modeler 630.

Modeling engine 631 within modeler 630 determines that based on the data contained within user record 404; model 620 should be selected behavior change models 620-628.

Model 620 could, for example, contain several stages 620a, 620b and 620c. Modeling engine 631 further determines that based on the data contained within user record 404, the user is currently at stage 620a. Modeling engine 631 then outputs model information 633 for further processing by the targeting engine 303.

Figure 6B:
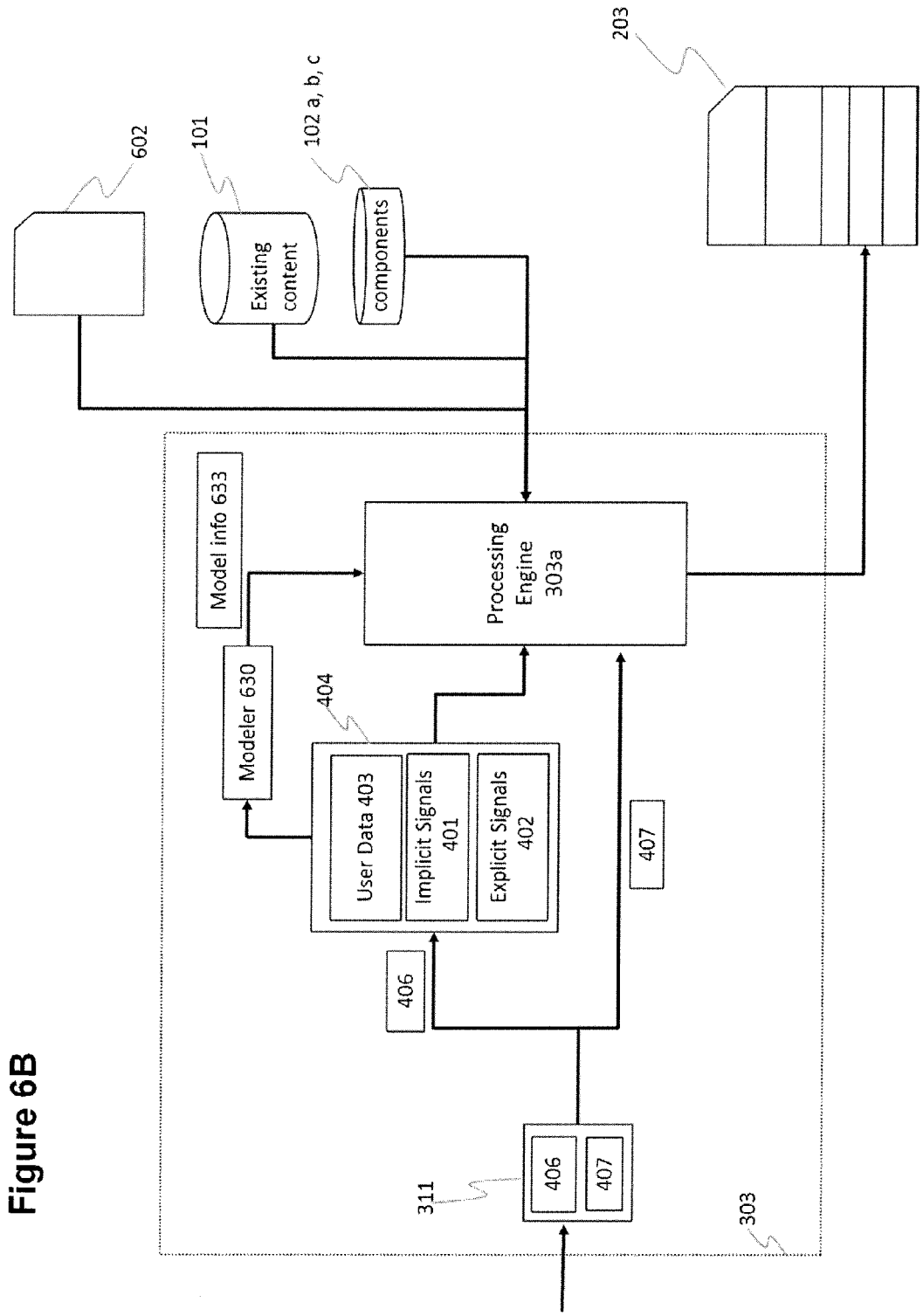
FIG. 6B demonstrates the generation of componentized content after the model grouping operation has taken place within the targeting engine.
Figure 6C:
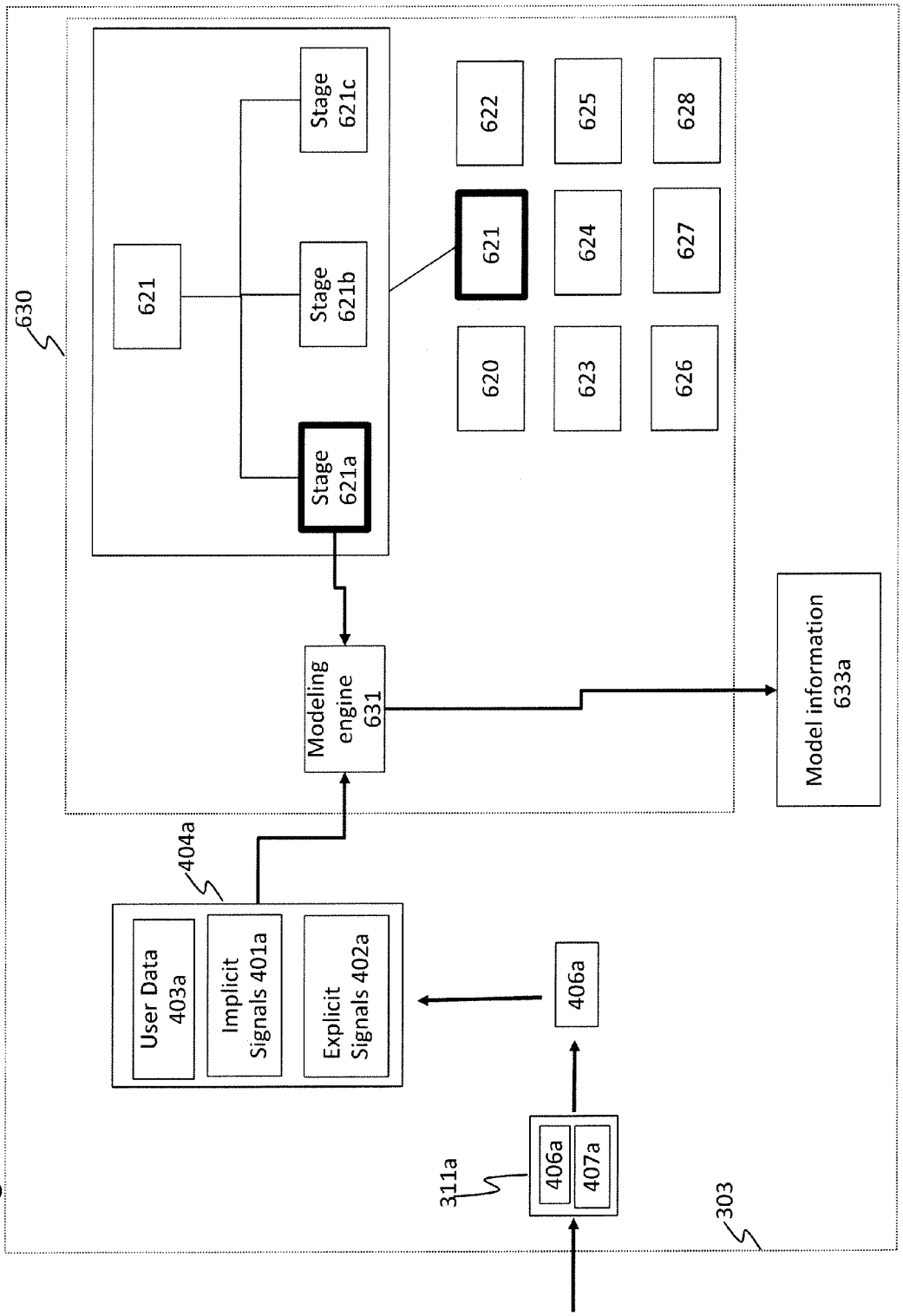
FIG. 6C demonstrates the model grouping operation for the first iteration of a sequential behavior change process within the targeting engine 303.

As shown in FIG. 6B, the processing engine 303a within targeting engine 303 takes user record 404, model information 633 and profile data packet 407, processes all this information and selects appropriate content from existing content database 101, and one or more component content databases 102a, 102b, and 102c. Processing engine 303a selects display template 602 and inserts information from existing content database 101 and one or more component content databases 102a, 102b and 102c to create one or more componentized content articles 203.

As explained previously, the system provides a way of delivering targeted content in order to influence a user into changing his/her behavior, or adopting new behaviors, using these behavior change models as a guide. A detailed example of one embodiment of a system to achieve this within the framework of a sequential behavior change process is described below in FIGS. 6C-6H.

Assume that the user is a recovering alcoholic. In the first iteration, in FIG. 6C, targeting engine 303 parses data output 311a to obtain data packet 406a and profile data packet 407a. Data packet 406a is processed into user record 404a. Based on the information contained within user record 404a, modeling engine 631 within modeler 630 selects behavior change model 621. Behavior change model 621 is a behavior change model for recovering alcoholics. It has three stages, 621a, 621b and 621c. Stage 621c is a final, desired stage, such as full recovery, while stages 621a and 621b are early and intermediate states of recovery, respectively. Therefore, the aim of the sequential behavior change process is to influence the user into entering state 621c. Modeler 630 decides further that the user is at the stage 621a of behavior change model 621, and needs to be at state 621c. Modeler 630 then sends all this information as part of model information 633a to processing engine 303a.

Figure 6D:
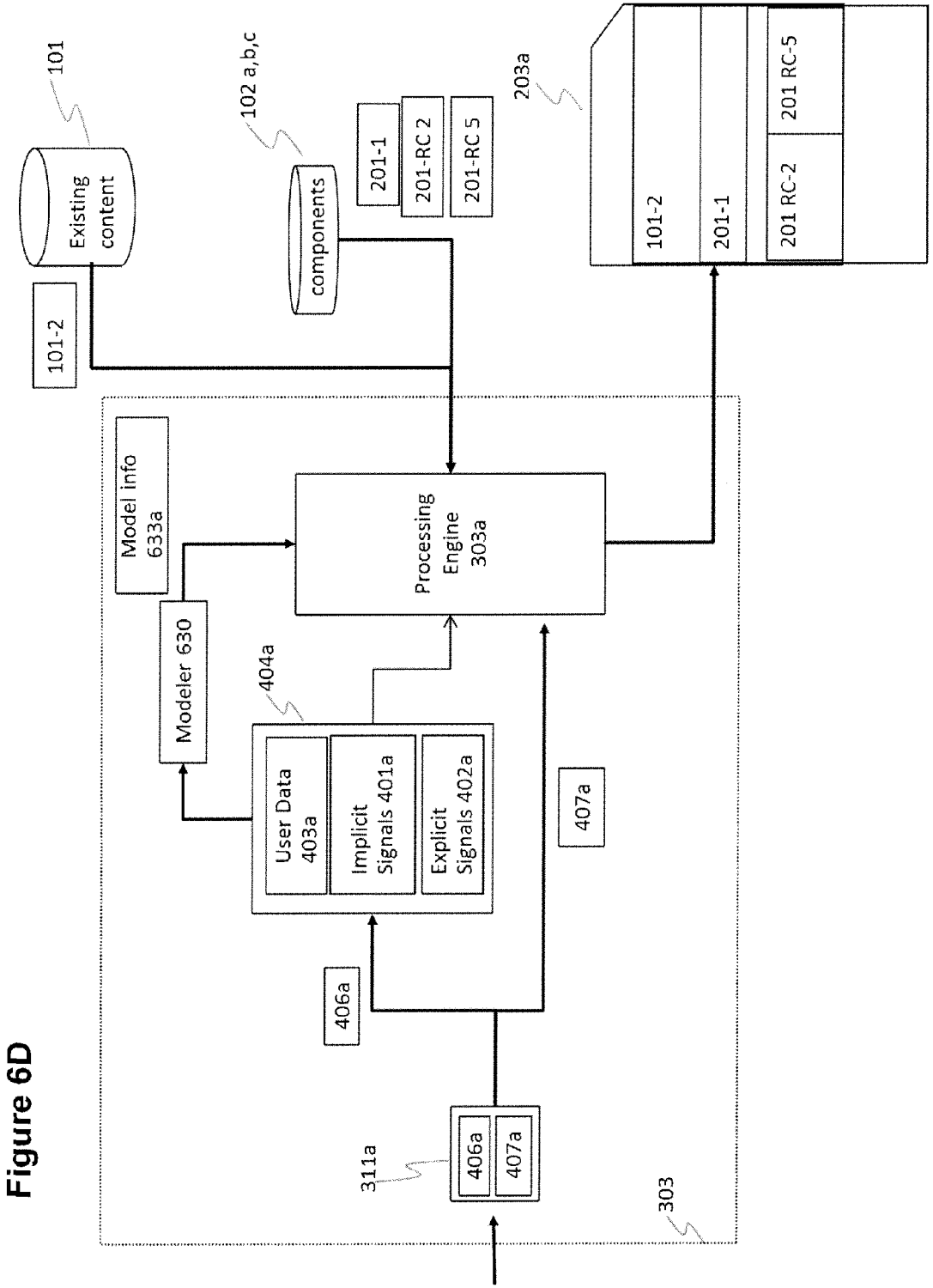
FIG. 6D demonstrates the generation of componentized content for the first iteration of a sequential behavior change process within the targeting engine 303.

In FIG. 6D, behavior change model 621 is associated with certain information in existing content database 101 and component content databases 102a, 102b and 102c. Processing engine 303a takes in user record 404a, model information 633a, and profile data packet 407a as inputs. Based on the information contained within model information 633a, the processing engine is able to determine that the user is at stage 621a, but needs to be at stage 621c. Based on these inputs, processing engine 303a then retrieves article 101-2 from existing content database 101. It also draws component content sequence 201-1 which is associated with the stage 621a of behavior change model 621, and two additional component content elements 201-RC2 and 201-RC5 that are associated with 201-1 but not necessarily associated with behavior model 621. It draws this component content from component content databases 102a, 102b and 102c. The resulting componentized content page 203a is created and transmitted to the user.

Figure 6E:
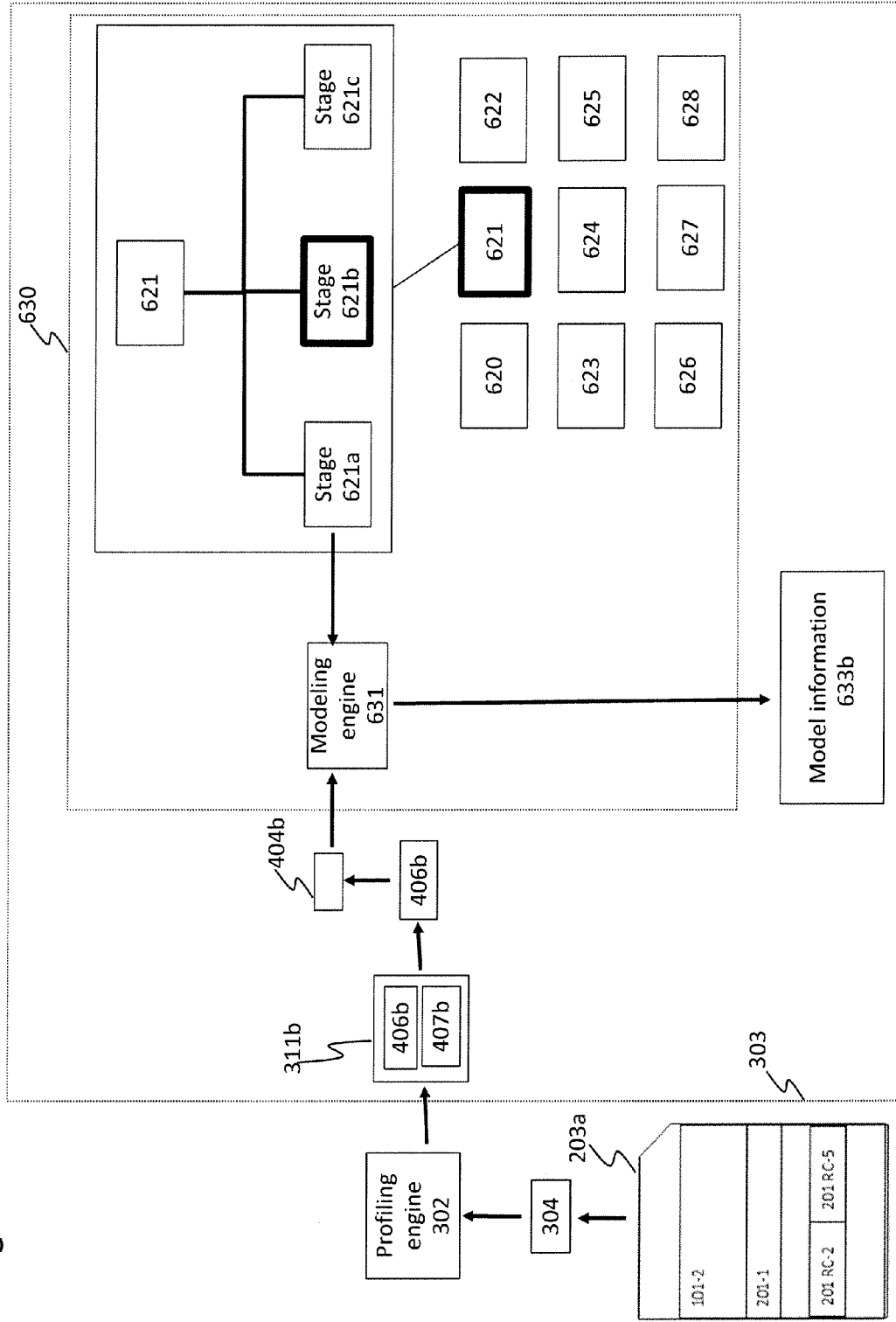
FIG. 6E demonstrates the model grouping operation for the second iteration of a sequential behavior change process within the targeting engine 303.

In the second iteration of the sequential behavior change process, as shown in FIG. 6E, depending on how the user interacts with 203a, signals 304 are sent to profiling engine 302. These signals are then packaged into data packet 406b by the profiling engine 302 and sent to the targeting engine 303 as part of data output 311b. In FIG. 6D, the modeler 630 within the targeting engine 303 determines from user record 404b within data packet 406b that the user is at stage 621b of behavior change model 621. The modeler is also able to determine that the user should be at final, desired stage 621c. This information is included in the model information 633b, which is then sent to targeting engine 303.

Figure 6F:
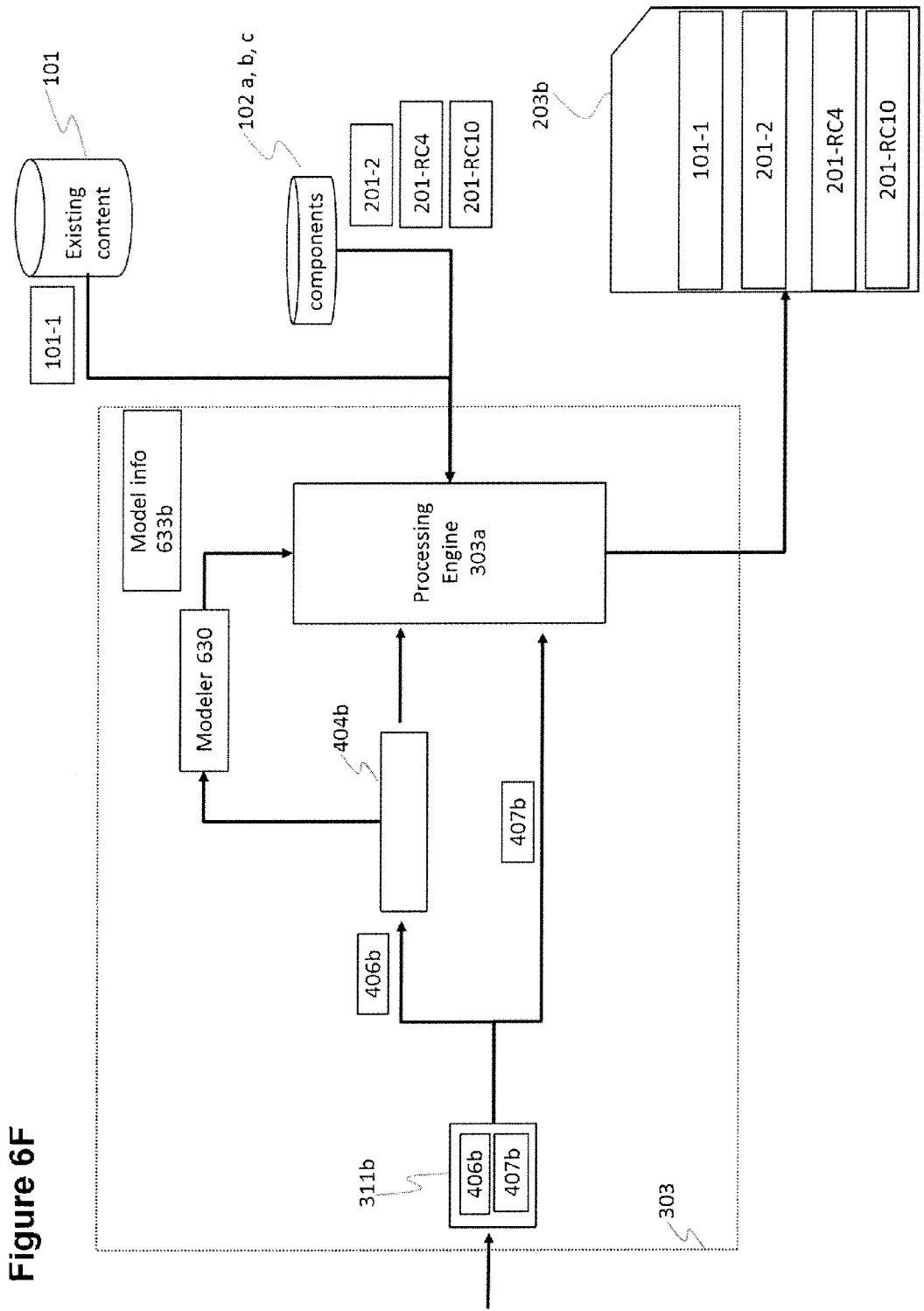
FIG. 6F demonstrates the generation of componentized content for the second iteration of a sequential behavior change process within the targeting engine 303.

In FIG. 6F, processing engine 303a takes model information 633b, user record 404b and profile data packet 407b. Based on the information contained within model information 633b, the processing engine 303a is able to determine that the user is at stage 621b, but needs to be at stage 621c. Based on this information and the required objective, processing engine 303a retrieves information so as to assist this transition. It retrieves existing component content 101-1 from the database. Since existing component content 101-1 is matched with the second component content 201-2 associated with behavior change model stage 690b, the processing engine 303a then retrieves component content 201-2. The processing engine 303a also retrieves additional component content 201-RC4 and 201-RC10. The resulting componentized content page 203b is created and transmitted to the user At the third iteration, in FIG. 6G, based on user interaction with page 203b, secondary data and signals 304 are generated and sent to profiling engine 302. Profiling engine 302 creates data output 311b, containing data packet 406c and profile data packet 407c. Based on the information stored within data packet 406c, the modeler 630 within the targeting engine 303 decides that the user is at stage 621c of behavior model 621, which is the desired stage for the user. The modeler 630 then transmits model information 633c to the targeting engine 303.

Figure 6H:
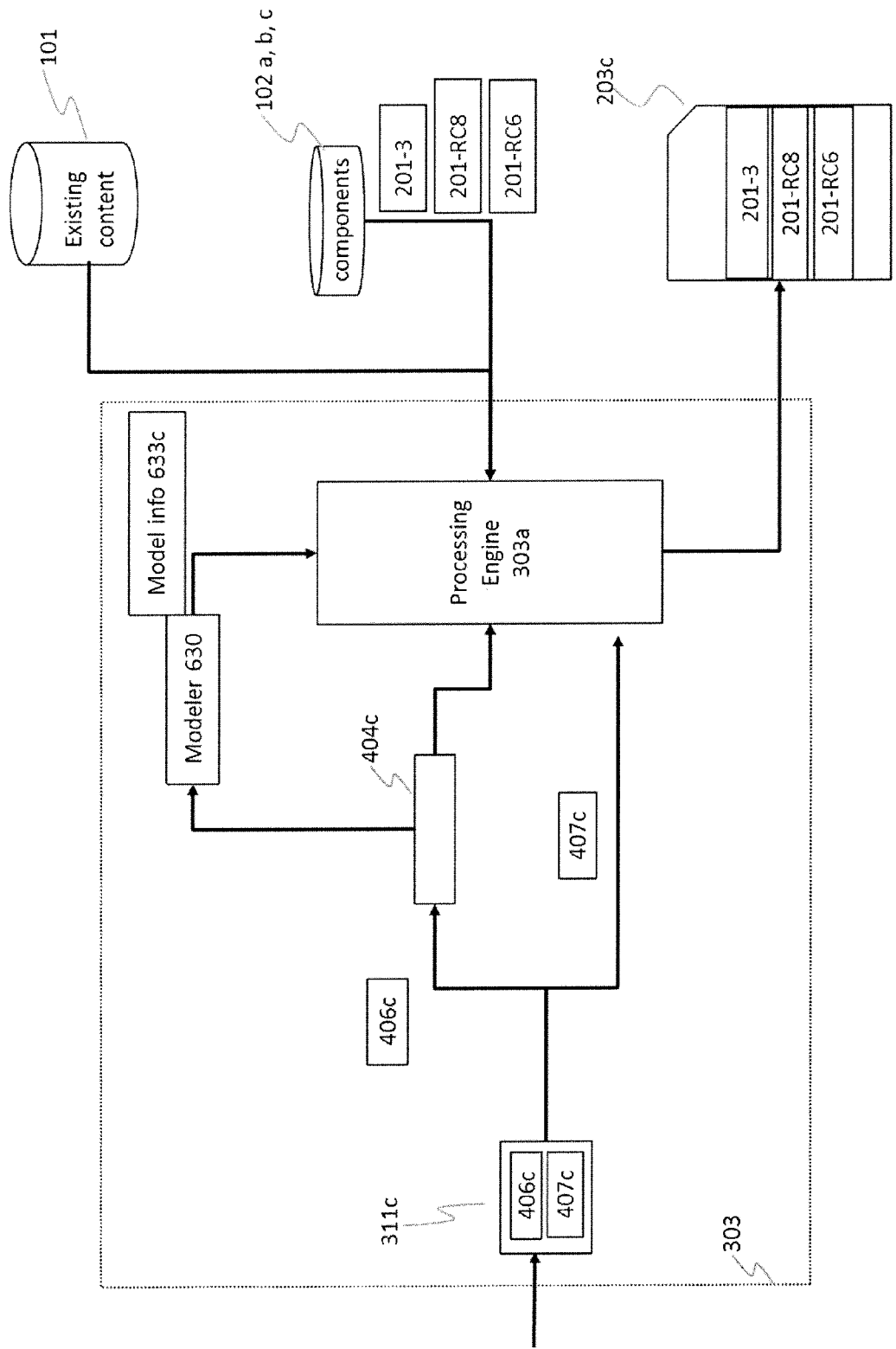
FIG. 6H demonstrates the generation of componentized content for the third iteration of a sequential behavior change process within the targeting engine 303.

In FIG. 6H, the processing engine 303a takes in user record 404c, profile data packet 407c and model information 633c. Based on these inputs, processing engine 303a determines that the user has reached the desired stage of 621 c. It may then retrieve component content sequence 201-3 as well as related component content 201-RC8 and 201-RC6, with the aim of stopping the user from regressing into stages 621a or 621b. It then creates a componentized content page 203c. Componentized content page 203c is then transmitted to the user.

While in this embodiment, three iterations of the sequential behavior change process have been demonstrated, the sequential behavior change process is not limited to three iterations or any particular number of iterations. Also, while the behavior change model shown above has three stages, behavior change models may have multiple stages. Furthermore, while this multi-iteration process flow has been demonstrated within the targeting engine 303, the same process can also take place in the profiling engine 302. It can also take place in a distributed fashion, the process being distributed between the profiling engine 302 and the targeting engine 303. For example, model selection may take place in the profiling engine 302, while stage determination may take place in targeting engine 303. Arrangements such as this enable distribution of data processing load between the profiling engine 302 and targeting engine 303. This could be especially important in cases where profiling engine 302 and targeting engine 303 are connected via a network. A distributed arrangement enables easier adaptation to network load and/or latency constraints.

In another embodiment, an editor can interact with the targeting engine to produce content for a user. An example of editor interaction with the targeting engine to produce content for a user who is coping with type 2 diabetes is demonstrated below.

Figure 6I:
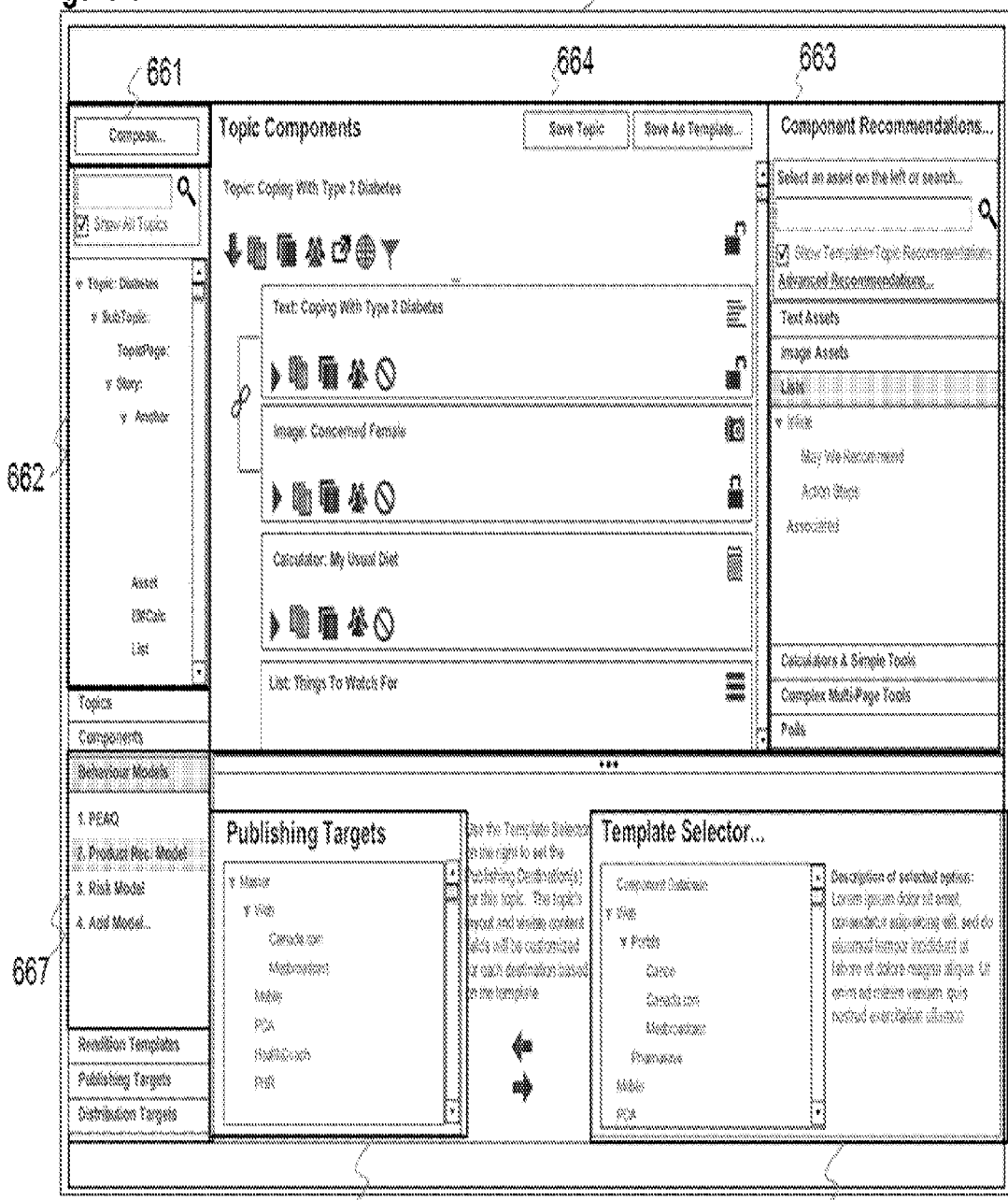
FIG. 6I shows a topic editor screen for an editor to interact with the targeting engine to produce content

In FIG. 6I, an editor wants to compose some new content on coping with Type 2 diabetes. The editor begins by using topic editor screen 660. The editor first begins by typing "Coping with Type 2 diabetes" in field 661. In field 662, the system displays all existing content. In field 663, the system will display component content filtered to target type-2 diabetes.

In order to ensure that the document follows a template, the editor can then select a template from list of possible templates 665. The selected templates will show up in window 666. The template defines what content is to be used in the document, and the layout of the document. The content and layout depends on, for example, the channel, user agreements and legal restrictions. Once this is complete, the editor can then drag and drop content into workspace 664 to create the document.

If the editor wants to tailor, for example, to follow a model, such as those shown in field 667, then the editor must first choose a tailorable template. A tailorable template allows the editor to choose or create variants. Different variants can then be directed to different segments within the model or different behavioral patterns. Behavioral patterns can be determined by the signals.

Figure 6J:
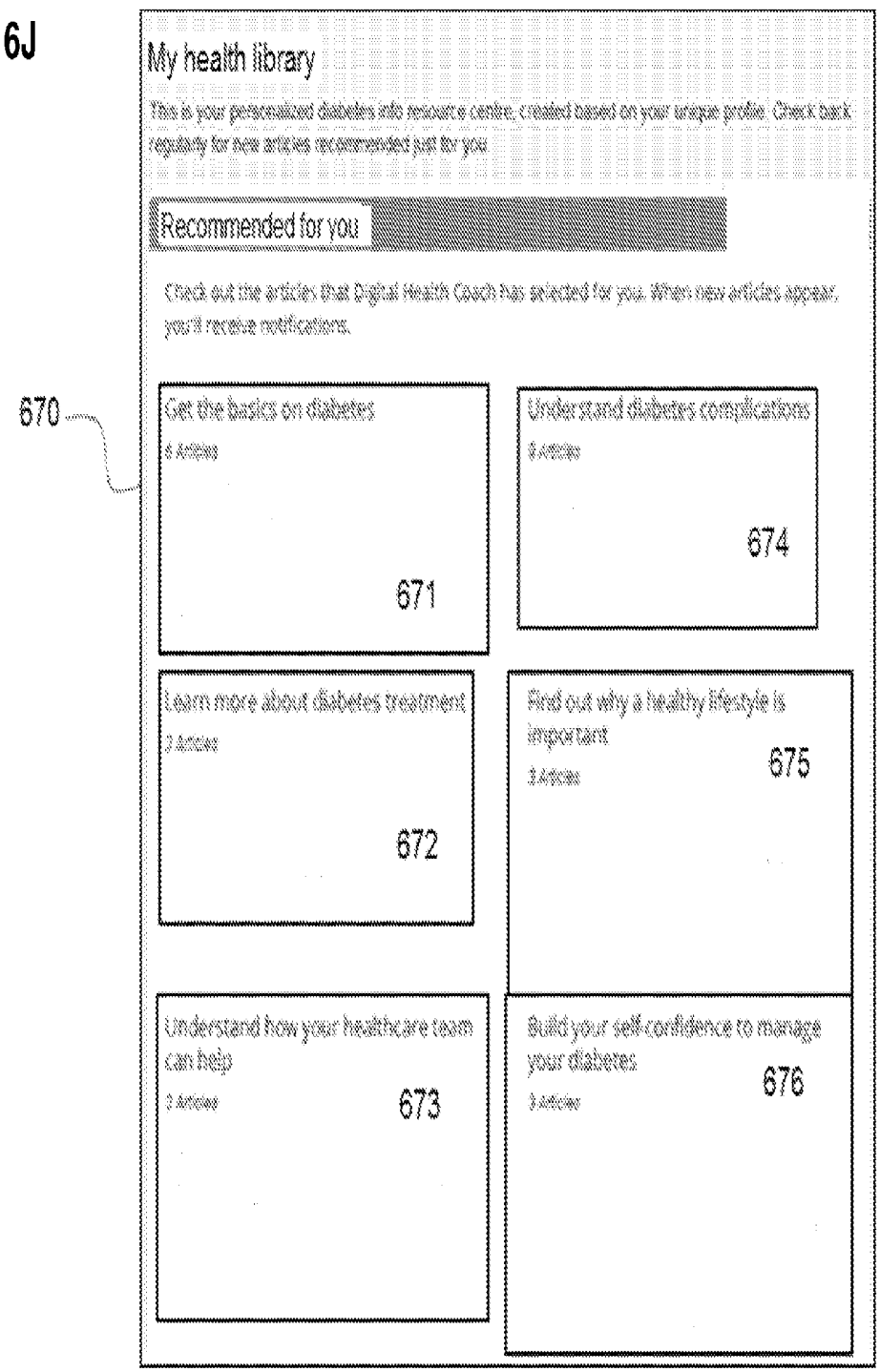
FIG. 6J shows a personalized document for a patient with low knowledge, confidence and self-management skills
Figure 6K:
FIG. 6K shows a personalized document for a patient with medium knowledge, confidence and self-management skills

FIGS. 6J and 6K show 2 different personalized documents 670 and 680 for two different users with type 2 diabetes. In order to personalize the document to each user, a behavior change model based on measuring a patient's knowledge, confidence and self-management skills is used.

Based on signals, which in this case are results of a standardized questionnaire to identify their stage, a patient profile is identified. One of the users has low knowledge, confidence and self-management skills; the other has medium knowledge, confidence and self-management skills. Customized content based on the behavior objective is then delivered in each document.

FIG. 6J shows document 670 presented to the user with low knowledge, confidence and self-management skills; while FIG. 6K shows the document 680 presented to the user with medium knowledge, confidence and self-management skills. While some sections are similar (e.g., sections 675 and 685), sections 671-674 are different from sections 681-684; and section 676 is different from section 686.

Figure 6L:
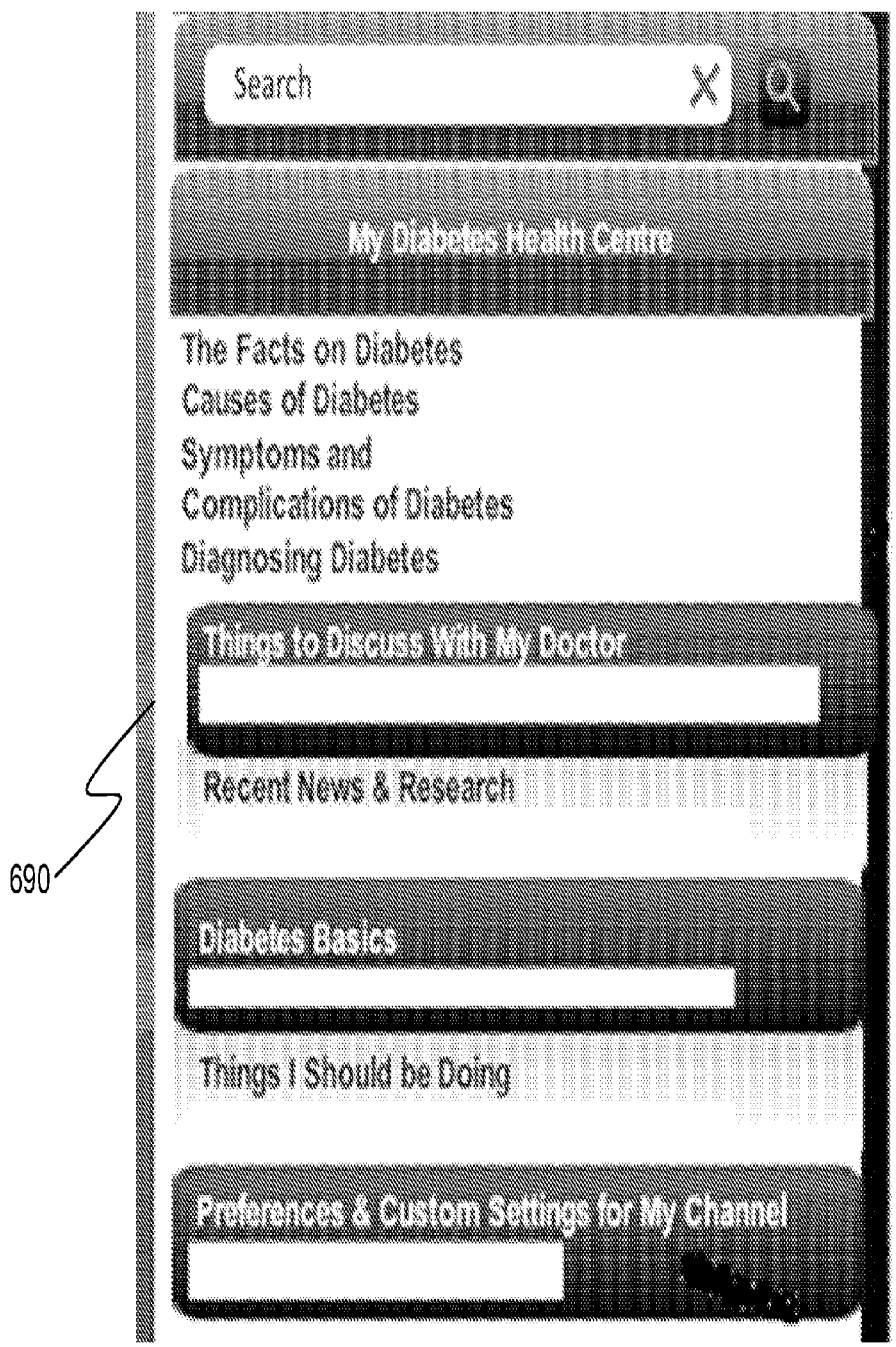
FIG. 6L shows a mobile rendition of a personalized document tailored for a mobile channel.

FIG. 6L shows another document 690, this time tailored for delivery over a mobile channel. The choice of channel was made based on mobile user behavior patterns/signals. View 690 shows a mobile rendition of the document 670 in FIG. 6J, but for mobile.

While the sequential behavior change process has been demonstrated for health care applications, this sequential behavior change process can be applied outside of healthcare. For example, the sequential behavior change process can be applied to marketing applications such as adoption of new products; student education; training of workers to adopt a new process at work; and disciplining of children.

The previous embodiment illustrates the use of a sequential behavior model to aid recovering alcoholics. However, the system can use any behavior model applied to any field. For example, a publishing company that owns a news website may want to influence reader patterns, such that readers are converted into in-depth news readers that view 20 pages or more per visit. For news publishers, in-depth news readers are of higher value since they generate more page views, are likely to visit the site more frequently, and generate more advertising revenue.

The system demonstrated in FIGS. 6C-6H collects data on a news reader. Based on this collected data, it then selects a non-sequential behavior change model, which groups news readers into three categories: (a) light news readers who view only 1 or 2 pages, (b) medium news readers who view between 2 and 19 pages, and (c) in-depth news readers that view 20 pages or more. The behavior change model is non-sequential, as under the model, it is possible that the reader could progress from light to in-depth without going through the medium stage.

The system then determines which category the news reader is in. If the news reader is a light news reader, then the objective is to convert the news reader into an in-depth news reader. Targeted content to achieve this objective is then provided to the news reader. By using this system to collect data on news readers, select an appropriate behavior change model, determine where the reader is with respect to a desired final stage, and create targeted component content to influence the reader into reaching the desired final stage, low-value light news readers can be converted to higher-value in-depth news readers.

Another example of how this system can be used is with social media websites or applications. It is known that only a small percentage of people post comments, however such comments are of high value to publishers. By integrating behavior change models and component content into social media content strategies, behavior can be modified to increase the number of users posting. This increases the value of the publisher's content and the value of the website to users. In this manner the system can adapt to a variety of needs for various publishers to increase the value of their content or publications.

In another possible embodiment, the success of targeted content in influencing the outcome(s) of a behavior change process is measured. This could be achieved, for example, by storing historical records to correlate targeted content to behavior change process success. Using the example demonstrated above, by looking at historical records, it may be possible to infer a low correlation between successful advance to stage 621c from 621a and providing component content 201-3. Therefore, it may be necessary for the targeting engine to provide other targeted content. Alternatively, the behavior change models used by the system may be reviewed, modified or replaced. This measurement may be performed, for example, by processing engine 303a, or on a separate sub-system which then communicates with targeting engine 303 via a network.

In another possible embodiment, the success of a particular behavior change model is monitored. For example, in the case of converting light news readers to in-depth news readers, there could be two different models the system could choose from. If, based on the analysis of data, the success of one model had begun to decline over a period of time, the system may then choose to select the other model. The monitoring may be performed, for example, by processing engine 303a, or on a separate sub-system which then communicates with targeting engine 303 via a network.

In another embodiment, user history is studied, in order to better target content. Using the example of behavior model 621 from above, if another user has a history of advancing to stage 621b from 621a, then regressing back into stage 621a, it may be necessary for the targeting engine to provide the user with different content to enable the user to successfully progress to stage 621c. User signals may also indicate that the behavior model needs to be modified or replaced in order to achieve the desired outcome. This may be performed, for example, by processing engine 303a, or on a separate sub-system which then communicates with targeting engine 303 via a network.

In addition, more sophisticated analytics can be used to provide publishers with valuable data on how users interact with content and optimize the behavior models that make up the system. This allows publishers to introduce intelligent services and more personalized user environments. These services and environments go beyond the traditional approach to analyzing server logs to allow the development of predictive modelling based on acquired signals.

In one embodiment, publishers collect at least two important characteristics of signals and use them for predictive modelling, (i) sequentiality (i.e., the order, or disorder, of events) and (ii) temporality (ability to capture when predicted actions are going to happen). Other analyses can reveal new pattern discoveries, clustering or associations that also benefit improved behavior modelling. Sequential and non-sequential association rules, Markov chains or other methodologies can be used to develop various behavior models or association rules that are specific for a particular set of content or industry using the content. In this manner publishers can assist in the development of new and effective models that improve the value of their content and the value of a digital application (website, mobile, computer-based) to the user. This may be performed, for example, by processing engine 303a, or on a separate sub-system which then communicates with targeting engine 303 via a network.

Figure 7:
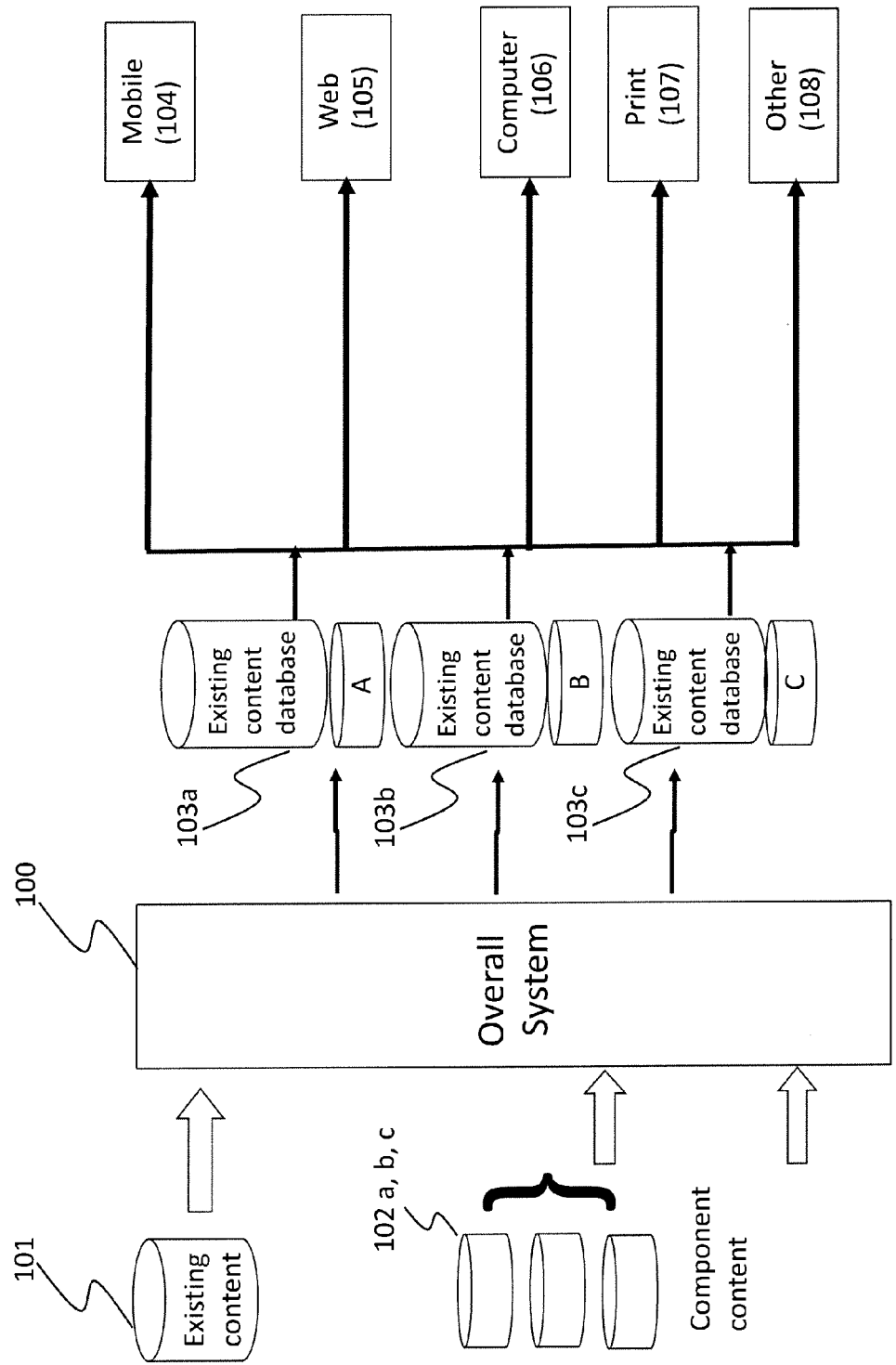
FIG. 7 demonstrates the operation of the overall system to generate database renditions from an existing content database and a component content database.

While the above embodiments retrieve content from existing content database 101 and component content database 102a, 102b, 102c, other embodiments are also possible. For example, FIG. 7 illustrates an embodiment in which the overall system 100 takes content from a single existing content database 101 together with one or more component content databases 102a, 102b, 102c and uses this to create one or more database renditions (103a, 103b, 103c). As shown in FIG. 7, each of the resulting content renditions (103a, 103b, 103c) can then be delivered across multiple media or distribution channels such as mobile device 104, web page 105, computer application 106, printer 107, and others 108. Each new database rendition (103a, 103b, 103c) can be used alone or in combination with other database renditions.

Figure 8:
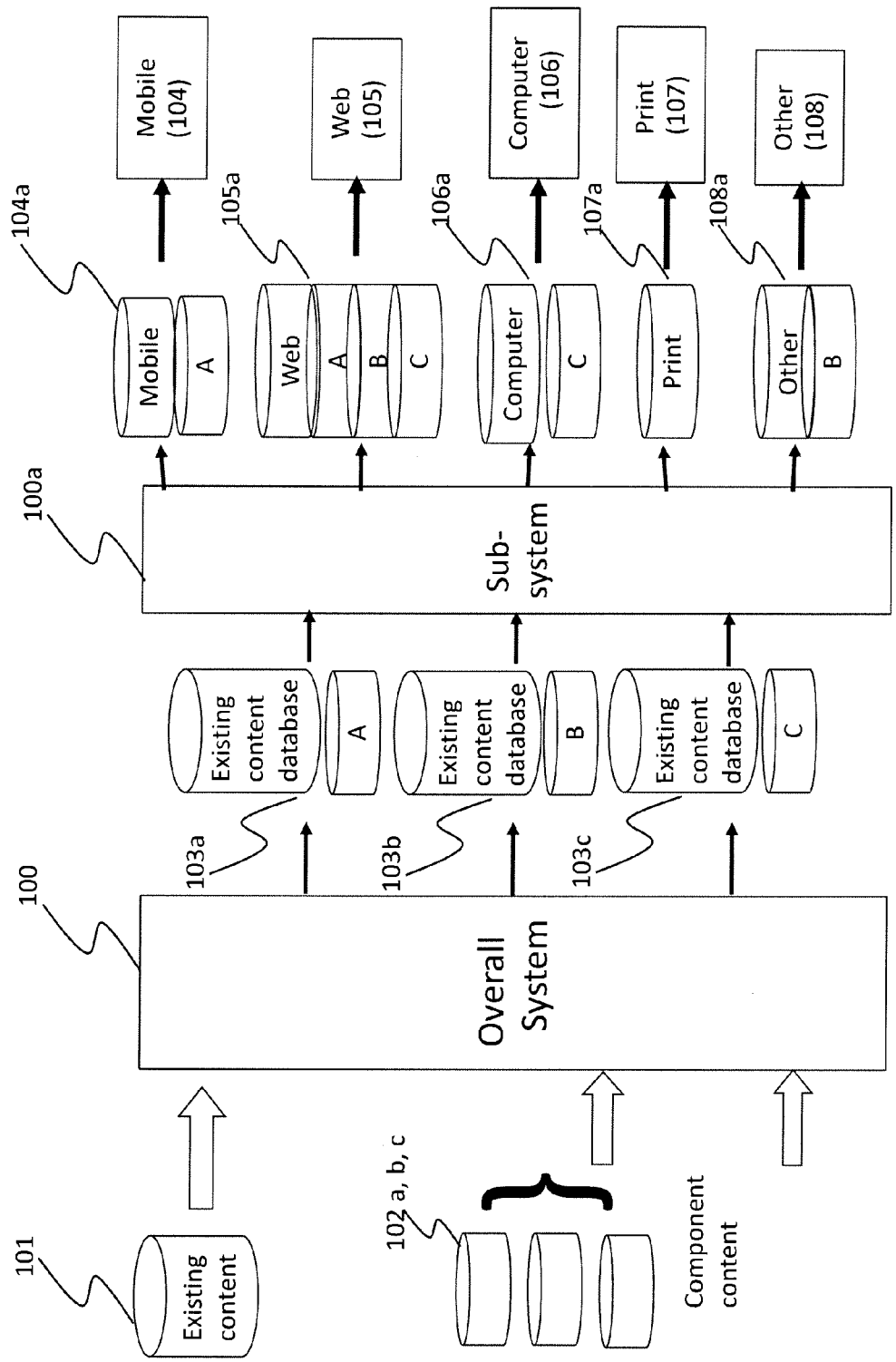
FIG. 8 demonstrates the operation of the overall system and a subsystem to generate sub-renditions from an existing content database and a component content database.

In addition, it is possible that there may be sub-rendition databases. These sub-rendition databases can, for example, contain content customized for delivery over one of the media or distribution channels, such as mobile, web, computer, print or other channels. This is shown in FIG. 8, where an overall system 100 creates renditions 103a, 103b and 103c. Subsystem 100a takes the rendition databases and creates sub-rendition databases 104a, 105a, 106a, 107a and 108a, corresponding to channels 104, 105, 106, 107 and 108, respectively. These sub-rendition databases can exist as discrete content databases so that a single content database can be indexed as separate databases by website crawlers or search engines.

In this manner the website crawler or search engine views each sub-rendition as unique, thus overcoming a common problem of search engines penalizing website publishers for using duplicate content across several websites and thus reducing their search engine rankings. Each sub-rendition of content can now be viewed as an original authoritative source.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for creating, based on a user's behavior, a document rendition to influence said user's behavior; and transmitting said document rendition to a user device associated with said user, said system comprising a profile processing unit to
generate a user record containing information regarding said user, wherein said user record is generated using two or more of
user data,
one or more implicit signals, and
one or more explicit signals;
a database to store said generated user record;
a profiling engine to
store multiple behavior change models, and
select a behavior change model from said multiple stored models, based on the information in said generated user record; and a targeting engine to
create current targeted content to influence the user associated with said generated user record to change behavior to approach said selected behavior change model,
insert said current targeted content into said document rendition,
further wherein said inserting of current targeted content performed so as to enhance capability of said document rendition to influence said user to change behavior,
customize said document rendition for transmission to said user device over a selected one or more of a plurality of distribution channels, and
transmit, to said user device, said customized document rendition over said selected one or more of a plurality of distribution channels.

2. The system of claim 1, further wherein
said targeting engine inserts one or more elements into said document rendition,
said one or more elements used to generate secondary data and signals when activated by said user,
further wherein said inserting of one or more elements is performed so as to enhance capability of said document rendition to influence said user to change behavior; and
wherein said profile processing unit
receives said secondary data and signals generated via said one or more elements, and
updates said generated user record based on said generated secondary data and signals,
said updating performed so as to enhance capability of future targeted content created by said targeting engine to influence said user to change behavior.

3. The system of claim 2, wherein said one or more elements comprise a hyperlink to a local event.

4. The system of claim 2, wherein said one or more elements comprise a download of a mobile application.

5. The system of claim 2, further comprising a secondary data processing unit to process said generated secondary data and signals prior to said updating.

6. The system of claim 2, wherein said profile processing unit is configured to discriminate between
said one or more implicit signals and one or more explicit signals, and
said generated secondary data and signals.

7. The system of claim 1, further wherein said one or more implicit signals and said one or more explicit signals are assigned strength coefficients.

8. The system of claim 1, further wherein said implicit signals comprise website click trails.

9. The system of claim 1, wherein at least one of said multiple stored models is non-sequential.

10. The system of claim 1, wherein said success of current targeted content in influencing the user to change behavior is measured; and
further wherein said processing engine modifies at least one of said behavior change models based on said measurement of success.

11. The system of claim 1, wherein said document rendition follows a tailorable template so as to enable said document rendition to more closely follow said selected behavior change model; and
said inserting is performed in accordance with said tailorable template.

12. The system of claim 11, wherein said tailorable template enables the choice of one or more variants directed to different stages within one of the stored multiple behavior change models.

13. The system of claim 11, wherein said tailorable template enables the choice of one or more variants directed to different behavioral patterns.

14. The system of claim 13, wherein said behavioral patterns are determined using said secondary data and signals generated by said one or more elements.

15. A method for creating, based on a user's behavior, a document rendition to influence said user's behavior; and transmitting said document rendition to a user device associated with said user, said method comprising
- generating, using a profile processing unit, a user record containing information regarding said user, wherein said generating is performed using two or more of
  - user data,
  - one or more implicit signals, and
  - one or more explicit signals;
- storing, using a database, said generated user record;
- storing, using a profiling engine, multiple behavior change models, and
- selecting, via a modeling engine running on said profiling engine, a behavior change model from said multiple stored models, based on the information in said generated user record;
- creating, using a targeting engine, current targeted content to influence the user associated with said generated user record to change behavior to approach said selected behavior change model,
- inserting, using said targeting engine, said current targeted content and one or more elements into said document rendition,
  - said one or more elements used to generate secondary data and signals when activated by said user, further wherein
  - said inserting of current targeted content and one or more elements performed so as to enhance capability of said document rendition to influence said user to change behavior;
- customizing, using said targeting engine, said document rendition for transmission to said user device over a selected one or more of a plurality of distribution channels;
- transmitting to said user device, using said targeting engine, said customized document rendition over said selected one or more of a plurality of distribution channels;
- receiving, using said profile processing unit, said secondary data and signals generated via said one or more elements; and
- updating, using said profile processing unit, said generated user record based on said generated secondary data and signals;
  - said updating performed so as to enhance capability of future targeted content created by said targeting engine to influence said user to change behavior.

16. The method of claim 15, further comprising assigning strength coefficients to said one or more implicit signals and said one or more explicit signals that provide indications of the accuracies of the said one or more implicit signals and said one or more explicit signals.

17. The method of claim 15, further comprising measuring said success of current targeted content in influencing the user to change behavior; and
- modifying, by said processing engine, at least one of said behavior change models based on said measurement of success.

18. The method of claim 15, wherein said document rendition follows a tailorable template so as to enable said document rendition to more closely follow said selected behavior change model; and
- said inserting of targeted content is performed in accordance with said tailorable template.

19. The method of claim 18, wherein said tailorable template enables the choice of one or more variants directed to different behavioral patterns; and
- said method further comprising determining said behavioral patterns using said secondary data and signals generated by said one or more elements.

20. The method of claim 15, further comprising discriminating, by said profile processing unit, between
(1) said one or more implicit signals and one or more explicit signals, and
(2) said generated secondary data and signals.

* * * * *